United States Patent [19]

Court

[11] 3,729,576

[45] Apr. 24, 1973

[54] ENCODING AND DECODING SYSTEM FOR CATV

[75] Inventor: Patrick R. J. Court, Los Angeles, Calif.

[73] Assignee: Optical Systems Corporation, Los Angeles, Calif.

[22] Filed: Feb. 8, 1971

[21] Appl. No.: 113,393

[52] U.S. Cl. ..... 178/5.1

[51] Int. Cl. ..... H04n 1/44

[58] Field of Search ..... 178/5.1

[56] References Cited

UNITED STATES PATENTS 3,184,537 5/1965 Court et al. ..... 178/5.1

3,081,376 3/1963 Loughlin et al. ..... 178/5.1

*Primary Examiner*—Benjamin A. Borchelt

*Assistant Examiner*—S. C. Buczinski

*Attorney*—Lindenberg, Freilich & Wasserman

[57] ABSTRACT

A video signal encoding system is provided by amplitude modulating a video carrier modulated with video, with a sinusoidal waveform whereby the amlitude levels of the sync portion of the video waveform as well as the video portion of the video waveform are altered. Decoding may be achieved by remodulating the encoded video waveform with a decoding sine wave in antiphase with the encoding sine wave and thereafter modulating the result, to eliminate residual error, with a cosine function wave applied in phase opposition to the error component of the resultant, which has twice the frequency of the basic encoding sine wave, but preferably the sequence of the decoding remodulations is reversed.

16 Claims, 23 Drawing Figures

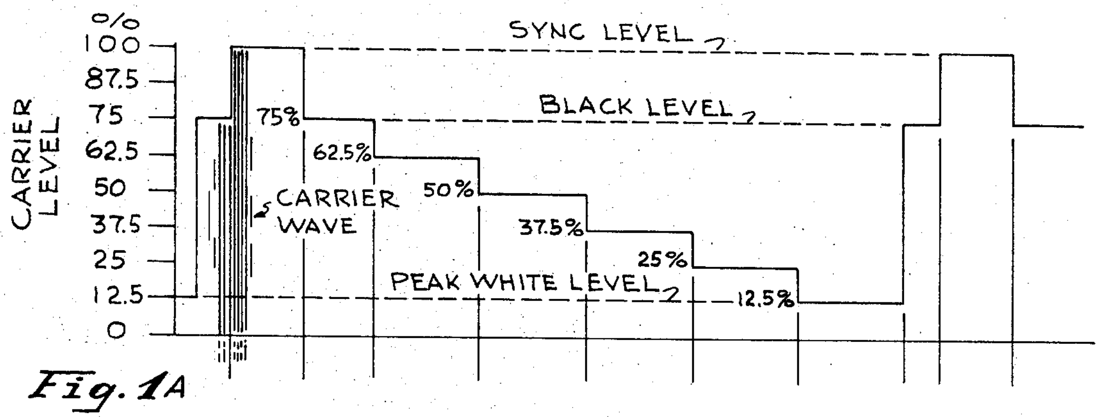
Fig. 1A
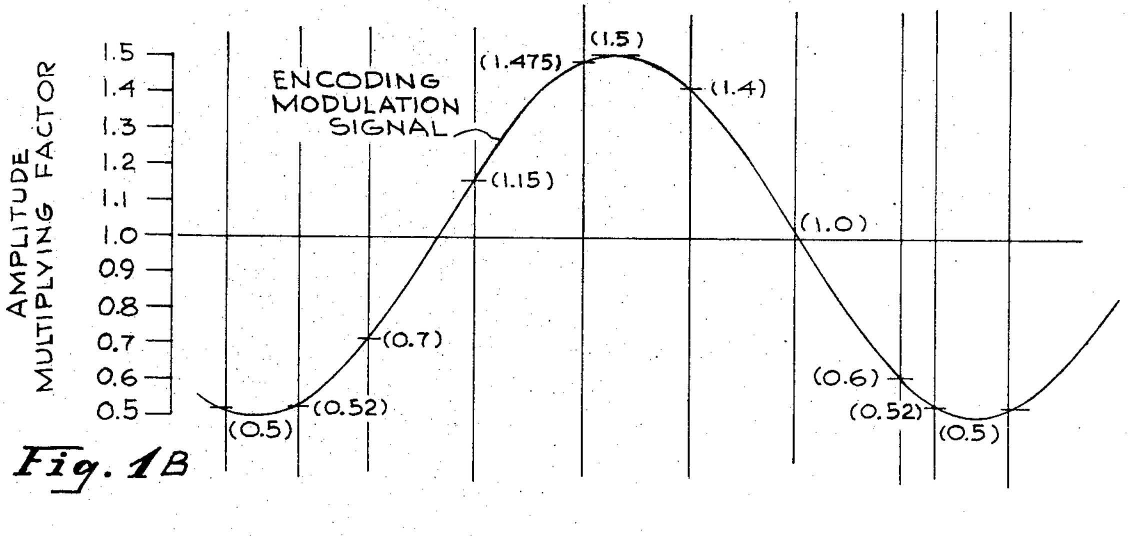
Fig. 1B
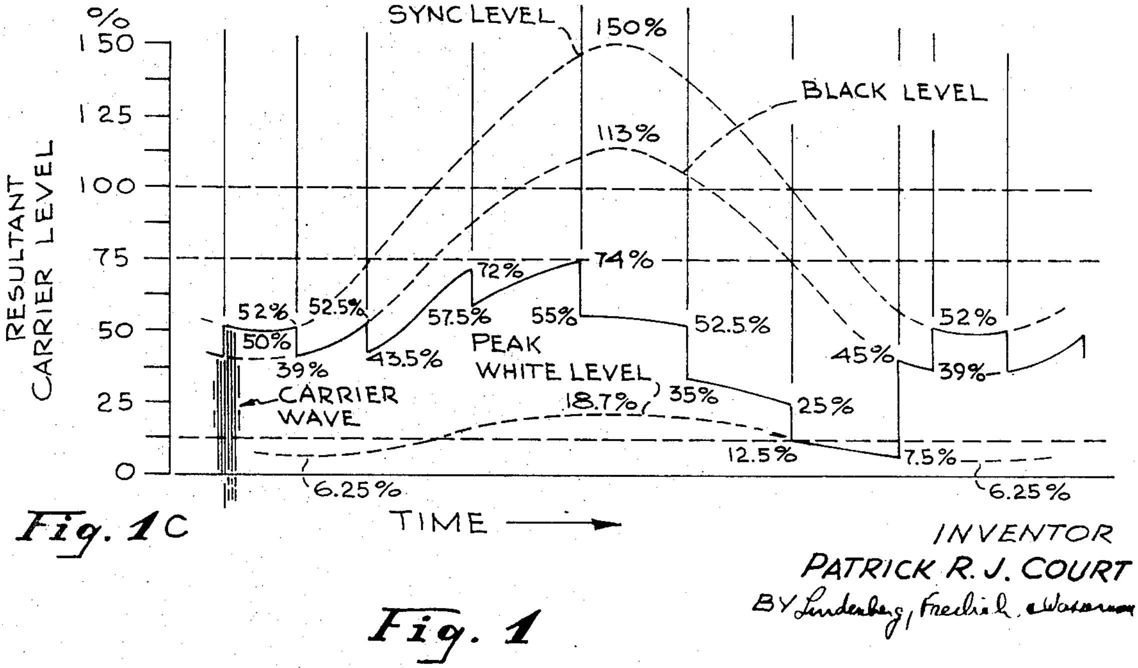
Fig. 1C
Fig. 1
INVENTOR
PATRICK R. J. COURT
BY Lindenberg, Freilich & Wasserman
ATTORNEYS

INVENTOR
PATRICK R.J. COURT

INVENTOR
PATRICK R. J. COURT

INVENTOR
PATRICK R. J. COURT

INVENTOR
PATRICK R. J. COURT

INVENTOR
PATRICK R. J. COURT

INVENTOR
PATRICK R. J. COURT

INVENTOR
PATRICK R. J. COURT

INVENTOR
PATRICK R. J. COURT

INVENTOR
PATRICK R. J. COURT

INVENTOR
PATRICK R. J. COURT

ENCODING AND DECODING SYSTEM FOR CATV

BACKGROUND OF THE INVENTION

1. Field of the Invention:

This invention relates to community antenna television systems and more particularly to an encoding and decoding system suitable for use therein.

Community antenna television systems, more commonly known as CATV, has extended from small communities, which are serviced because of difficulties in receiving broadcasts from television stations, which were not received either due to the physical location of the community or the distance from the station, into big cities where it is a convenience in apartment houses or where it is necessary because of shadows or echos caused by tall buildings. Techniques have been developed for transporting, over the CATV system, many more than the twelve standard VHF channels (2 through 13), making it possible to offer a greater diversity of services to subscribers than merely supplying them with the standard channels. Through the use of push/pull distribution amplifiers, for example, it is now practicable to transport a bandwidth of up to 300 MHz, allowing the transmission of approximately 35, 6 MHz television channels on a single cable without mutual interference. Since standard television receivers are incapable of tuning more than 12 VHF channels, a subscriber converter is necessary to provide the extra tuning capability.

With the availability of this much channel capacity, it now becomes possible to provide private channels for special interest, such as doctors, stockbrokers and law enforcement agencies, and also to provide special channels for entertainment other than is available on the standard television channels, received over the air.

To implement the additional classes of service, it is necessary that the transmissions be encoded in some way which will render them secure against unauthorized viewing by those subscribers who are not provided with appropriate decoding equipment. Unlike the problem faced in subscription TV, where signals were radiated on the air to the world at large, CATV signals are provided over a cable. The cable itself therefore creates a degree of security. However, whenever encoding systems are employed with a CATV system, the encoding process should effectively destroy the entertainment value of the program when it is received by a television receiver which does not have an associated decoder.

This brings up a second problem and that is how secure must the encoding system be to provide adequate security. It has been found that the more "adequate" the security, the more expensive the encoding and/or decoding system. Since the decoder must be provided to many thousands of subscribers, in order to keep the system within the bounds of economic feasability, the expense of the decoding system must be minimized. Further, the decoding system must render the signals decoded in a form suitable for presentation to the antenna terminals of a subscriber's TV receiver without any other modifications.

The encoding and decoding process should not perceptively degrade the entertainment value of the received picture, in comparison with those reproduced from standard transmission.

2. Description of the Prior Art

In a U.S. Pat. No. 3,081,376 to Loughlin et al., at a transmitter a sinewave signal together with sync suppression and other signals are added to the baseband video signal prior to being modulated on a carrier, in order to achieve encoding. The process is an additive one rather than a multiplicative one, which latter is achieved by a modulating process. Decoding is achieved at the receiver however by recovering from the audio carrier the sinewave used at the transmitter and thereafter modulating the received video carrier therewith. Because the multiplicative decoding process cannot adequately cancel the effects of the additive encoding process but rather here introduces additional distortion of its own, the "decoded" video leaves much to be desired as far as the viewer is concerned.

In a U.S. Pat. No. 3,001,011 to Weiss et al., and in a U.S. Pat. No. 3,478,166 to Reiter and Court encoding of the video was achieved by depressing the amplitude of the sync (and sometimes the blanking) signal into the region of the video intelligence. A preferred sync level was 50 percent of the excursion of the video intelligence. The video intelligence was left unaltered. In order to decode the encoded video, properly timed pulse signals are required to restore or augment the gray sync signals. Unless the timing of the restoring pulses is accurate, super-restored video information is developed which can prevent proper receiver synchronization.

OBJECTS AND SUMMARY OF THE INVENTION

An object of this invention is to provide an encoding-decoding system for CATV which is relatively inexpensive to implement while providing adequate security for the transmission.

Another object of this invention is the provision of encoding-decoding system for CATV which destroys the entertainment value of the program unless it is properly decoded, while providing a decoded program with substantially undetectable impairment.

Still another object of the present invention is the provision of an encoding-decoding system for CATV wherein the decoding circuits at the subscriber receiver are available as a plug-in unit.

Yet another feature of the present invention is the provision of an encoding-decoding system for a CATV system wherein the signals carried on the CATV cable are confined within the standard channel bandwidth and do not cause cross talk with other channels.

Yet another feature of the present invention is the provision of an encoding-decoding system for CATV systems wherein the subscriber converter to which a decoder, in accordance with this invention has been plugged, can function to process either standard broadcasts or encoded broadcasts for the following television receiver without any intervention.

The foregoing and other objects of the invention are achieved in the encoding process by modulating the previously modulated video carrier with a sine wave which has a phase and frequency selected so as to depress the synchronizing pulses and blanking information while enhancing the video signal in between. This has the effect of drastically altering the normal amplitude relationship between the sync and video intelligence, so that amplitude separation of the sync by the television receiver, is no longer possible. Thus, the entertainment value of the video portion of the program is effectively destroyed.

Decoding may be accomplished by first modulating the encoded signal with a decoding sine wave which has the same frequency but which is in antiphase with the encoding sine wave modulation, and which has the same depth of modulation. This however does not completely restore the video program signal to its original form but rather partially restores it. There is still present a signal, which may be called an error signal which, unless removed, considerably mars the video picture which will be displayed. To remove this error signal or residual modulation component, a second "remodulation" is required with a cosine wave which has twice the frequency of the initial modulating sine wave and which is applied in phase opposition to the error signal. While this does not completely eliminate all of the error components of the resulting video signals, these are eliminated to the point where they are substantially unnoticable.

However, as explained in detail hereinbelow, it is preferred to perform the decoding procedure by "remodulating"the encoded video at the transmitter with the second remodulating signal. The resultant video is still sufficiently scrambled so that the entertainment value thereof is destroyed. At the receiver,provision is made to restore the entertainment value of the video by modulating it with the first decoding sine wave.

In a second embodiment of the invention, in addition to performing the described "remodulation" step at the transmitter, another "enforced scrambling" step is added wherein the resultant of the modulation and remodulation comprises modulation by an additional cosine wave component which has the frequency of one half of the primary encoding modulation with a relatively low modulation degree. Finally decoding is accomplished at the receiver, as before, by modulating the received video, on the carrier, with a sine wave at the same frequency but in antiphase with the encoding wave.

BRIEF DESCRIPTION OF THE DRAWINGS

FIGS. 1A, 1B and 1C respectively illustrate a typical portion of a video signal, a modulating sinusoidal signal and the modulated video signal, which are shown to assist in an understanding of this invention.

DESCRIPTION OF THE PREFERRED EMBODIMENTS

The standard NTSC television waveform (and all other known standard television waveforms used in other countries), is specifically constructed so as to permit amplitude separation, in the television receiver, of the synchronizing information from the video intelligence. DC restoring techniques are universally employed in the receiver to insure that only the synchronizing pulses, which uniformly extend from 75 percent to 100 percent of the total waveform amplitude excursion, are accepted by the sync separating circuits. The variable video intelligence which occupies the balance of the waveform amplitude excursion is totally rejected by the sync separator. The separated horizontal and vertical pulses are subsequently processed and are used for accurate timing of the sweep circuits which create the scanning raster.

The present invention accomplishes the encoding of the video intelligence by drastically altering the normal amplitude relationship between the sync and video intelligence so that amplitude separation of the sync is no longer possible.

Figure 6A:
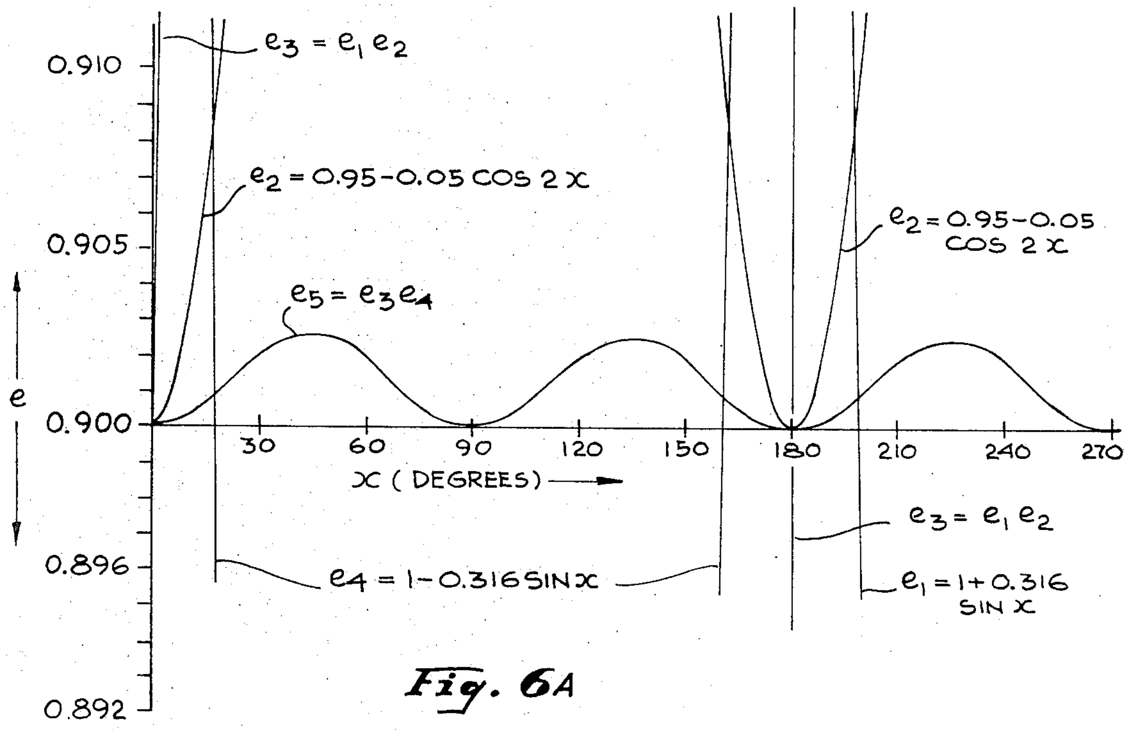
FIGS. 6A and 6B respectively show residual error modulation with and without the DC component applied during secondary modulation.
Figure 6B:
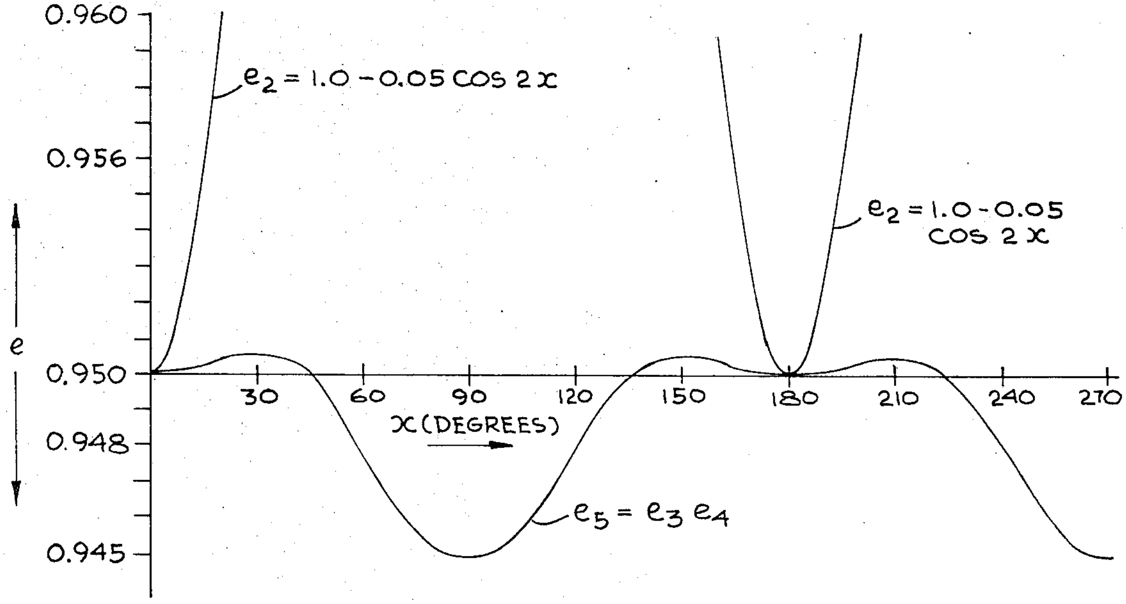

FIGS. 1A, B, and C through FIGS. 6A and 6B comprise various waveform drawings shown to assist in an understanding of this invention.

FIGS. 1A, 1B and 1C

FIGS. 1A, 1B and 1C respectively illustrate a typical portion of video signal, a sinusoidal encoding signal and the video signal after modulation with this additional sinusoidal encoding signal. For ease of understanding, the original video is shown as a "staircase" type signal, which extends from black level at 75 percent, to peak white at 12.5 percent modulation depth. FIG. 1A represents the original video modulation. It is understood of course that this signal is modulated upon a carrier wave, with modulation depths corresponding to the scale at the left, and that only one half of the modulation envelope is shown.

FIG. 1B shows the encoding modulating signal which may be considered as an amplitude multiplying factor. Assuming a 50 percent depth of modulation, the multiplying factor has values ranging between 0.5 and 1.5. The amplitude multiplying factor scale is shown at the right, and significant factors are noted at points along the sinusoidal curve. FIG. 1C shows the composite modulation which results from additionally modulating the signal of FIG. 1A with that of FIG. 1B. Each point on the curve of FIG. 1C is the resultant of multiplying the original modulation percentages by the corresponding multiplying factor. Thus peak sync at 100 percent reduces to 50 percent as a result of multiplying by 0.5, from the corresponding multiplying factor of curve 1B, etc.

As an aid to understanding, in FIG. 1A, dotted lines are shown to indicate sync level at 100 percent, black level at 75 percent and peak white level at 12.5 percent. When modified by the appropriate factors from curve 1B these reference levels become as shown dotted in FIG. 1C. Thus the resultant sync level curve centers around its original mean level of 100 percent but extends from 150 percent to 50 percent. The resultant black level curve centers around its original mean level of 75 percent but extends from a maximum of 113 percent to a minimum of 37.5 percent, while the resultant peak white level curve centers around its original mean of 12.5 percent and extends from a maximum of 18.7 percent to a minimum of 6.25 percent.

In reality of course the resultant sync level curve is a reference curve only. Because of the relative phasing of curves 1A and 1B, horizontal sync will always be depressed to 50 percent, and the resultant peak carrier can never reach the 150 percent point shown, because horizontal sync information can never exist at that point.

Between sync pulses however, the original video can have an excursion anywhere between black level at 75 percent and peak white at 12.5 percent. So the modified video of FIG. 1C may reach the indicated maximum point of 113 percent on the resultant black level curve, and may also reduce to the indicated minimum of 7.5 percent shown on the resultant peak white level curve. It cannot reach the theoretical minimum of 6.25 percent because peak white information never exists at that point.

The important results arising from this additional modulation are as follows:

1. The sync information is generally depressed with respect to its original level, while the video information between sync pulses is generally enhanced with respect to its original level.

2. The original video experiences a profound disturbance of its DC content.

It will be noted that, unlike the standard waveform of FIG. 1A, the waveform of FIG. 1C does not permit a normal sync separator to function, as portions of the video intelligence are of greater amplitude than the sync information. The output of the sync separator will therefore tend to consist more of video than of sync, with the result that a normal television receiver, unequipped with an appropriate decoding device, will tend to produce a confused and jumbled picture, i.e., it will be "scrambled." Only when the original picture content remains at a transmitted level less than 25 percent do the suppressed sync pulses remain greater in amplitude than the video. The enhanced video occurring in the middle of a line is then $1.5 \times 25 = 37.5$ percent in the encoded video, which corresponds in amplitude to the encoded blanking. Thus with pictures containing a largely white background, synchronization of a sort can and does occur.

In addition to the confusion due to the inability of the receiver to synchronize with the encoded video of FIG. 1C, the profound disturbance to the DC content, resulting from the sinusoidal modulation, will distort the visible picture content, further increasing the scrambling effect. The combination of the two effects is such as to largely destroy the entertainment value of the transmitted video information as interpreted by a normal TV receiver.

Decoding is the inverse or complement of encoding, and decoding of the signal represented in FIG. 1C involves remodulation with a signal which completely cancels the effect of the encoding modulation. At first it might be thought that remodulation with a decoding sinewave in antiphase with the encoding sinewave modulation and with the same depth of modulation, would result in complete cancellation of the encoding signal. However, it may be quickly demonstrated that this preliminary assumption is incorrect. If a remodulating decoding sinewave is assumed which causes the same modulation depth of ±50 percent, its amplitude multiplying factor, as before, extends from 0.5 to 1.5, but in phase opposition.

Multiplication of the depressed resultant sync level (at 50 percent) by a factor of 1.5 increases sync not to 100 percent where it should be, but to $150 \times 0.5 = 75$ percent. Multiplication of the enhanced resultant sync level (at 150 percent) by a factor of 0.5 reduces this level to $150 \times 0.5 = 75$ percent instead of the desired 100 percent. However if one considers those portions of the resultant sync level curve which remained at 100 percent as a result of original multiplication by 1.0 (i.e., where the encoding sinewave crossed the datum line at 1.0) and also considers the effect of remodulation with an inverse sinewave which also crosses the datum line at 1.0, it is noted that the resultant decoded level remains at 100 percent. Clearly there is a residual modulation component or error remaining after the two modulation processes, which amounts to 25 percent, and which is in some way related to the amplitudes of the encoding and decoding modulation functions.

Because of this somewhat surprising result the following analysis was made of the error component, its causes and of the corrective measures which could be taken.

For simplicity of analysis consider the effect of modulation and inverse remodulation upon a steady carrier wave, rather than upon a carrier previously modulated with the complex video waveform. Later the analysis will be extended to a carrier modulated with video.

Mathematically, modulation is a multiplicative process. Note the general expression for a modulated wave:

$$e = E_o \sin\omega_1 t(1 + m \sin\omega_2 t) \quad (1)$$

where $e$ = instantaneous value of the modulated wave,
$E_o$ = average amplitude of the wave
$m$ = degree of modulation
$f_1 = \omega_1/2\pi$ = carrier wave frequency
$f_2 = \omega_2/2\pi$ = modulating frequency
and $m$ also = $E\ max - E_o/E_o$ (positive peaks)
= $E_o - E\ min/E_o$ (negative peaks)

Since the interest here is in the effect of modulation and inverse remodulation upon the envelope of the carrier, the frequency of the carrier $\omega_1/2\pi$ is of no concern. Also there is no concern with the frequency of the modulating wave $\omega_2/2\pi$. The expression in equation (1) may therefore be simplified to $$e = E_o(1 + m \sin x) \quad (2)$$

The envelope for the encoding sine wave modulation may be defined as $$e_1 = E_o(1 + m \sin x) \quad (3)$$

while the envelope for the inverse decoding sine wave modulation may be defined as $$e_2 = E_o(1 - m \sin x) \quad (4)$$

For simplicity of computation it may also be assumed that the initial unmodulated carrier $E_o$ has a peak value of 1.0. Equations (3) and (4) therefore reduce to $$e_1 = 1 + m \sin x \quad (5)$$

and $$e_2 = 1 - m \sin x \quad (6)$$

When a carrier wave with an initial value of 1.0 is successively modulated with equal amplitudes of $\sin x$ and $-\sin x$, each with degree of modulation $m$, the resultant envelope $e_3$ is the product of equations (5) and (6). Hence $$e_3 = e_1 e_2 = (1 + m \sin x)(1 - m \sin x) = 1 - m^2 \sin^2 x \quad (7)$$

From the trigonometric identities it is known that: $1 - K\sin^2 x = K\cos^2 x + (1-K)$ (where K is a constant) and $$\cos^2 x = 1 + \cos 2X/2$$

Hence from equation (7):

$$e_3 = 1 - m^2 \sin^2 x$$
$$= m^2 \cos^2 x + (1 - m^2)$$
$$= m^2 (1 + \cos 2x/2) + (1 - m^2)$$
$$= m^2 (0.5 + 0.5 \cos 2x) + 1 - m^2$$
$$= 0.5m^2 + 0.5m^2 \cos 2x + 1 - m^2$$
$$e_3 = 1 - 0.5m^2 + 0.5m^2 \cos 2x \quad (8)$$

$e_3$ is a residual or error modulation envelope resulting from the two successive equal and opposite sinewave modulation processes and accounts for the discrepancies noted earlier in consideration of FIG. 1. It is clearly a cosine function of twice the original modulation frequency and has a peak amplitude of $0.5m^2$, which corresponds to a peak to peak error amplitude of $m^2$.

Figures 2A, 2B:
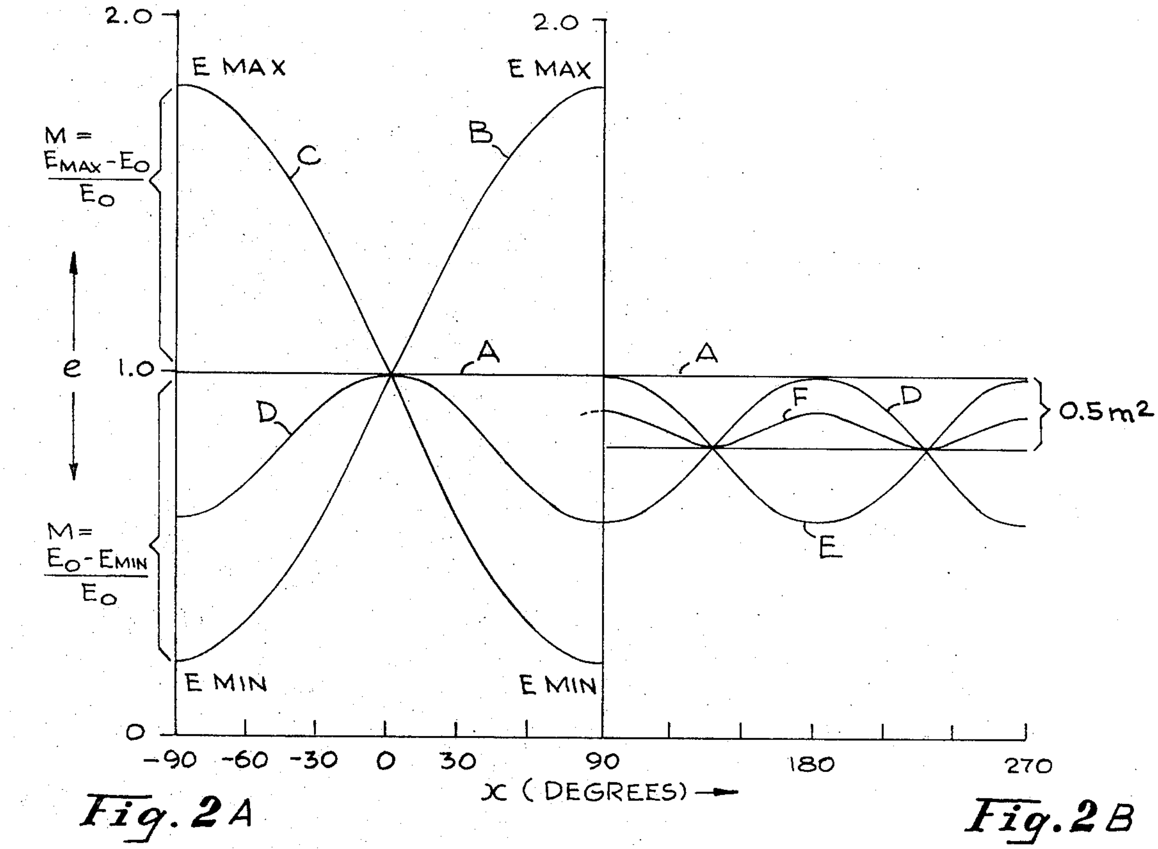
FIGS. 2A and 2B are waveforms representative of the results of the modulation process, shown to assist in an understanding of the invention.

FIGS. 2A and 2B

FIGS. 2A and 2B constitute graphical representations of these modulation processes. In FIG. 2A, curve A shows the envelope of the original unmodulated carrier, with a steady peak value of 1.0. Curve B shows the envelope of the carrier resulting from the encoding modulation with the function $m \sin x$, while curve C shows the envelope consequent to decoding modulation with the function $-m \sin x$. $m$ of course can have values ranging from 0 to 1.0 and in this illustration the scale is arbitrarily chosen, as is the scale for curve D which illustrates the envelope of the residual, twice-frequency cosine error component.

The negative constant $0.5m^2$ which appears in equation (8) represents a reduction in average carrier amplitude from the original $E_o = 1$, as a consequence of the two modulation processes. If this constant did not exist, the curve D would center around a mean level of 1.0.

The peak to peak amplitude of the residual cosine error component is a function of $m^2$ and therefore reduces sharply as $m$ assumes values approaching zero.

At this point some consideration shall be given to finding the optimum value for $m$, as it applies to the encoding and decoding sinewave modulations. Referring back to FIGS. 1A, 1B and 1C wherein a value of $m$ of 0.5(50 percent modulation) was chosen, it is noted that the resultant black level curve shown in FIG. 1C has a maximum value of 113 percent with respect to the original peak sync of 100 percent shown in FIG. 1A. In a CATV system this is undesirable, because one of the criteria of system design is the cross-modulation capability of the broadband distribution amplifiers, which is a function of the peak amplitudes of the many video carriers which these amplifiers are handling simultaneously. It is obviously good practice to limit the horizontal rate, peak carrier excursions, with encoded transmissions, to the normal peak sync values as they exist in non-encoded transmissions; i.e., 100 percent. As the black curve has an original value of 75 percent and, when encoded, should not exceed 100 percent, the optimum value of $m$ is therefore given by $$m_{(max)} = E_{max} - E_{o/Eo} = 100 - 75/75 = 0.333$$

This is an awkward number and it is really not that critical. Values of $m = 0.3$ to 0.35 or even 0.4 may be successfully employed to achieve the requisite degree of scrambling, without causing perceptible cross-modulation in the amplifiers of the cable distribution system.

With the optimum theoretical value of $m$ of 0.333, as applied to the video waveforms of FIG. 1C, the resultant enhanced black level is 100 percent, while the resultant depressed peak sync level is 66.6 percent. Thus a "figure of merit" for the encoding or scrambling process may be defined which is the ratio between these two quantities. With $m = 0.333$ the figure of merit is $100/66.6 = 1.5$. Experience has shown that this ratio is more than adequate to assure satisfactory scrambling.

Returning again to the discussion of the residual error component, with reference to FIGS. 2A and 2B it should be noted that with the value of $m = 0.333$, the residual error component is relatively small. From equation (8), with $m = 0.333$, the peak to peak value of the error $e_3$ is 0.111. This leads to the concept that the residual error may virtually eliminated by means of a secondary correction decoding (or encoding) modulation, employing a twice-frequency cosine function applied in phase opposition to the error component. In view of the square law characteristic form which applies here, it may be expected that any residual error remaining from this additional secondary modulation process will be extremely small.

From equation (8) it is known that the error:

$$e_3 = 1 - 0.5m^2 + 0.5m^2 \cos 2x$$

The envelope resulting from the secondary correction modulation therefore has the form:

$$e_4 = 1 - 0.5m^2 - 0.5m^2 \cos 2x \quad (9)$$

The remaining error envelope, $e_5$, resulting from this additional correction modulation is equal to the product of $e_3$ and $e_4$, hence:

$$e_5 = e_3 e_4 = [(1 - 0.5m^2) + 0.5m^2 \cos 2x][(1 - 0.5m^2) - 0.5bk2\cos 2x]$$

$$= [1 - 0.5m^2]^2 - 0.25m^4 \cos^2 2x$$

$$= 1 + 0.25m^4 - m^2 - 0.25m^4[0.5 + 0.5 \cos 4x]$$

$$= 1 - m^2 + 0.25m^4 - 0.125m^4 - 0.125m^4 \cos 4x$$

$$e_5 = 1 - m^2 + 0.125m^4 - 0.125m^4 \cos 4x \quad (10)$$

From equation (10) it is evident that this remaining error component is a cosine function of four times the frequency of the original encoding and decoding modulations, and with a peak amplitude of $0.125m^4$ or a peak to peak amplitude of $0.25m^4$. The quantities $m^2$ and $0.125m^4$ are constants representing changes in the average peak carrier voltage. The curves resulting from this additional modulation are shown graphically in FIG. 2B. Again the scale chosen for $e$ is arbitrary. Curve E is representative of the secondary correction function, $e_4$, from equation (9) while curve F is representative of the residual error, $e_5$ from equation (10).

Figure 3:
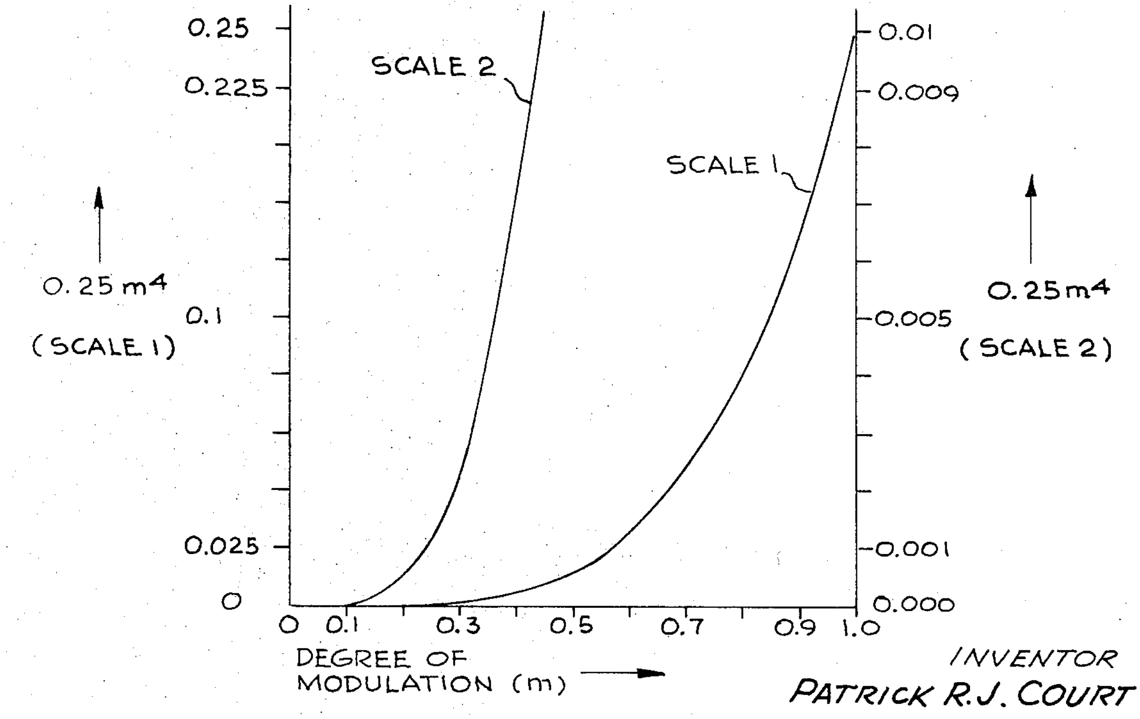
FIG. 3 is a graph showing the remaining fractional error resulting from sine, inverse sine and twice frequency cosine modulaion.

FIG. 3 is a plot of this remaining fractional error, resulting from the sine and inverse sine modulations and the twice-frequency correction cosine modulation, as a function of $m$. Two ordinate scales, scale 1 and scale 2, are chosen to permit the plotting of the very small values of $0.25m^4$ as $m$ approaches zero.

The assumption regarding the magnitude of this remaining error is shown to be correct. It may be noted that with the values of $m$, for the encoding and decoding sinewave modulations and with the appropriate value for the secondary decoding cosine modulation which is being considered, the remaining error modulation is extremely small.

For example, from FIG. 3, with $m = 0.2$, the remaining fractional error is less than 0.0005. When $m = 0.3$, the error is 0.0002, and when $m$ is 0.4, the error is 0.0064. In all cases the remaining error is much less than 1 percent peak to peak and would be completely invisible.

When $m$ reaches a value of 0.5, the error exceeds 1 percent and in fact is 0.0125 of the original carrier value $E_o = 1$.

Referring back to FIG. 2C, it is apparent that even this tiny remaining error of four times the original modulating frequency could be compensated by yet another secondary correction modulation in antiphase. In this case it can be shown that the error which would remain has the equation:

$$e_7 = 1 - 2m^2 + 1.25m^4 - 0.25m^6 + 0.0078m^8 - 0.0078m^8 \cos 8x \quad (11)$$

The peak to peak error is then $2(0.0078m^8) = 0.0156m^8$, and the error frequency is eight times the original modulating frequency.

To achieve theoretical perfection, where the final error is zero, an endless series of secondary modulations would be required, each one at a frequency which is twice the frequency of the preceding modulation, and with a degree of modulation which is a function of the square of the preceding degree of modulation, applied in antiphase to the preceding error.

Clearly, the greater the initial modulation degree, the more times this process would have to be repeated until the residual error is small enough to be negligible.

However, with values of m which are likely to be used for encoding/decoding (i.e., values from 1.2 to 1.5), only one secondary correction is necessary to assure invisibility of the remaining error. For example, if $m = 0.3$ is assumed, then the remaining peak to peak error modulation is 0.002. This comprises 0.2 percent modulation at a frequency which is exactly four times the horizontal sync frequency. Thus the remaining error comprises four stationary vertical shaded "bars" with an amplitude of two tenths of 1 percent of the carrier value that exists due to the video modulation itself. It is quite evident that such a perturbation would be quite invisible and woulld be much less than normal disturbances such as residual hum modulation, shading, etc. It may therefore be concluded that the concept of a single secondary correction cosine modulation of twice the frequency of the original encoding sine modulation and inverse decoding sine modulation is valid and practicable.

If the encoding/decoding process is considered as a whole it is evident that there are three modulation processes in series.

It is also evident that, as all three processes are in series, one has the option of applying the correction modulation either at the transmission end or at the reception end. From an economic viewpoint it is obviously preferable to apply the correction remodulation at the transmission end of the interest of simplifying the decoder. Only one encoder has to be provided in a system, but a decoder is required for every subscriber to the service. Technically the system would seem to work as well either way, but the economic advantages performing the secondary correction at the transmitter appear to be overwhelmingly favorable.

Consider now the consequences of applying the secondary correction (cosine $2x$) modulation at the transmitter, rather than at the receiver. Of interest is the effect, if any, upon the "figure of merit" of the encoding process as it relates to scrambling, as discussed previously.

The approach to be taken in the following analysis is to empirically plot the modulation envelope resulting from two successive modulations. The first, primary encoding modulation has the form $m \sin x$ and results in the modulation envelope:

$$e_1 = 1 + m \sin x$$

The secondary correction encoding modulation has the form $0.5m^2 \cos 2x$ and results in the modulation envelope $$e_2 = 1 - 0.5m^2 - 0.5m^2 \cos 2x$$

The composite modulation, $e_3$, is the product of $e_1$ and $e_2$, thus:

$$e_3 = e_1 e_2 = (1 + m \sin x)(1 - 0.5m^2 - 0.5m^2 \cos 2x)$$

To plot the resultant curve a value of $m$ (and hence $m^2$) is chosen which is in the desired range (i.e., approx. 0.3) and which leads to simple computations and graphical plotting.

With $m = 0.316$, $m^2$ is 0.1.

Figure 4:
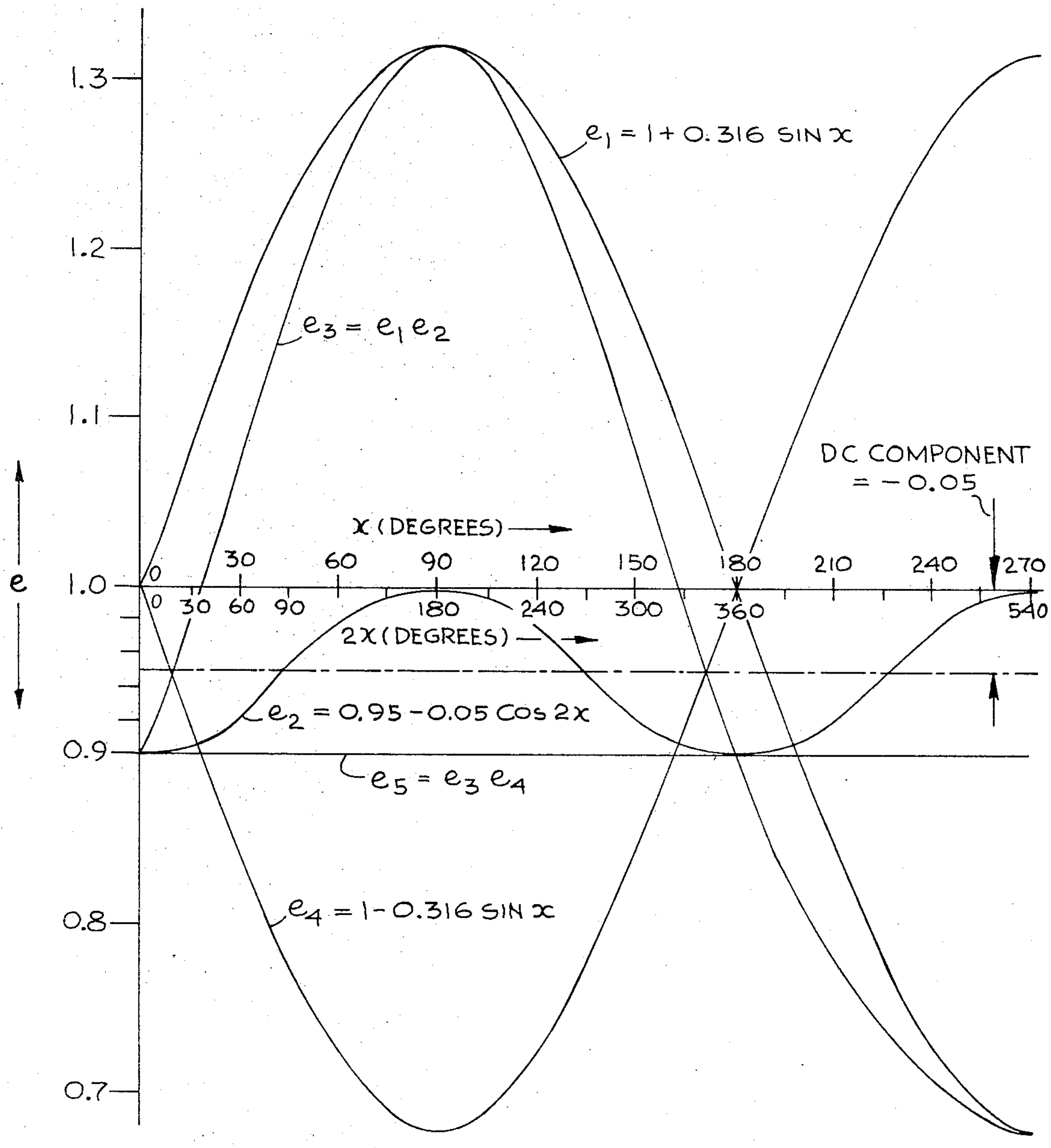
FIG. 4 are curves illustrating modulation and demodulation effects, which are shown to assist in an understanding of the invention.

FIG. 4 comprises an empirical plot of $e_1$ and $e_2$ and the resultant curve $e_3$ for $m = 0.316$. It also shows $e_4$ the antiphase decoding function and $e_5$ the decoded carrier.

$e_1$ becomes $1 + 0.316 \sin x$ $e_2$ becomes $1 - (0.5)(0.1) - (0.5)(0.1 \cos 2x) = 0.95 - 0.05 \cos 2x$ $e_3$ becomes $(1 + 0.316 \sin x)(0.95 - 0.5 \cos 2x)$ The curves are plotted for values of $x$ from 0° through 270°. The composite curve $e_3$ in FIG. 4 manifests the presence of "second harmonic distortion" which is to be expected from combining a fundamental curve with some portion of a signal at twice the frequency.

Curve $e_3$ represents the composite encoding function. Curve $e_4$ represents the antiphase decoding function and has the form $e_4 = 1 - 0.316 \sin x$. This is the simpler function which would be applied to each decoder.

The curve $e_5$ is the envelope of the decoded carrier and is the product of $e_3$ and $e_4$. With the scale chosen for $e$, it is not possible to resolve the cos $4x$ frequency component illustrated in curve F, FIG. 3B, as this amounts to only 0.0025. Curve $e_5$ therefore appears as a straight line in FIG. 4, which is exactly what is desired.

It is also evident that the combination of the primary encoding function and the secondary correction function at the transmitter has had no deleterious effect upon the scrambling figure of merit. The positive and negative peak amplitudes of the composite curve $e_3$are identical to the corresponding peak amplitudes of the simple curve $e_1$ and there is therefore no change in the relative amplitudes of "depressed sync" and "enhanced video."

Referring again to FIG. 4, the curve of $e_1$ swings symmetrically about the original datum line of $e = 1.0$. This is consistent with AC coupled modulation, in which there is no DC component. The curve of $e_4$ also is representative of AC coupled modulation.

The secondary correction component however does not swing symmetrically about the datum line $e = 1.0$ and is representative of a modulation applied with a DC component of $-0.05$ or half the peak to peak amplitude of this modulation. An inspection of the curves of FIG. 4 indicate that this DC component may be important.

Without the DC component, the curve $e_2$ would have the equation:

$$e_2 = 1 - 0.05 \cos 2x \text{ instead of:}$$

$$e_2 = 0.95 - 0.05 \cos 2x$$

Figure 5:
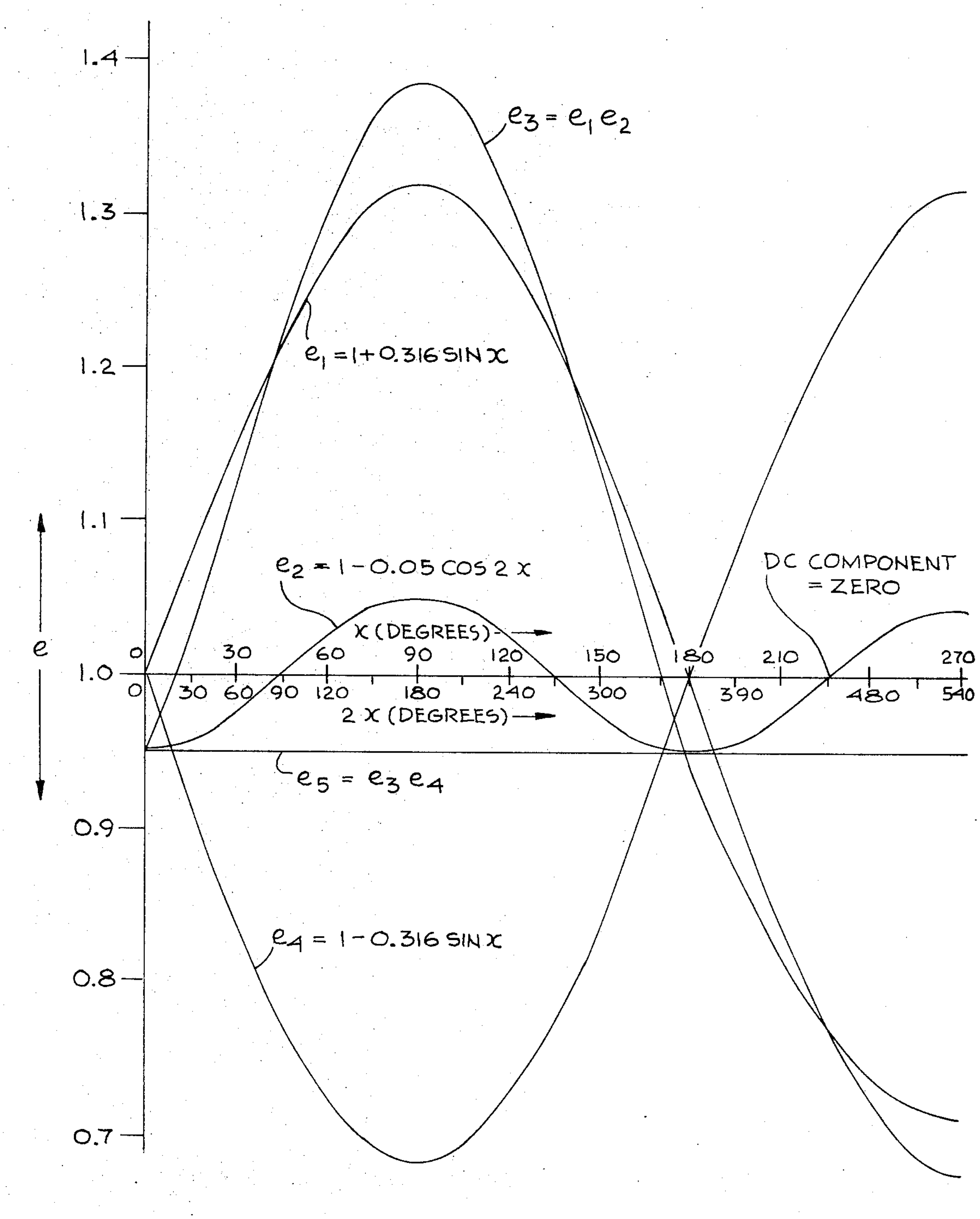
FIG. 5 is an empirical plot of the curves of FIG. 4 with the DC component eliminated from the secondary correction modulation function.

FIG. 5 is an empirical plot of the curves of FIG. 4 with the DC component eliminated from the secondary correction modulation function.

It will be noted that the omission of the DC component on the curve $e_2$ has had the effect of enhancing the carrier voltage $e$, both at the crest and the trough of the envelope. This results in enhancing black level beyond 100 percent carrier (referred to a normal transmission) and raising the suppressed carrier level during horizontal sync time. To maintain black level at the normal 100 percent, would require reducing the value of $m$, which would further reduce the suppression of horizontal sync. Thus the scrambling figure of merit would have to be degraded below the desired figure of 1.5 which was discussed previously.

FIGS. 6A and 6B

FIGS. 6A and 6B respectively show the residual error modulation both with and without the DC component applied during the secondary modulation process. In these two figures the scale chosen for $e$ is such that the residual error component can be resolved.

In FIG. 6A, the residual error curve $e_5$ is clearly a cosine with a frequency of $4x$ and with a peak to peak amplitude of 0.0025, as may be predicted from FIG. 3.

In FIG. 6B, the residual error curve is no longer of cosine form and has a peak to peak amplitude of 0.0055. This is more than twice as great as that achieved if the DC component is preserved in the secondary correction modulation function.

The first conclusion that may be drawn from any examination of these results is that the concept of secondary correction modulation, employing a cosine curve of twice the frequency of the primary encoding (and decoding) sine modulation is completely valid, and results in almost perfect error cancellation.

The second conclusion that may be drawn is that optimum results obtain if the secondary correction modulation is applied with the DC component preserved. This implies that a DC restorer by employed at the secondary correction modulator.

The third conclusion that may be drawn is that the secondary correction modulation may be applied at the transmitter, instead of the receiver, provided that DC restoration of this modulation function is used. In this case, the scrambling figure of merit is preserved.

From the foregoing analysis it is believed that there has been demonstrated the practicability of altering the sequence of the various modulators, so that the encoding modulator and the correction remodulator are located at the transmitter and the decoding remodulator is located at the receiver. This is the system shown in FIG. 7. For convenience henceforth the encoding modulator will be called the "primary encoding modulator." The decoding remodulator will be called the "-decoding modulator."

In a functioning system it is necessary to convey the decoding signal to the receiver, preferably within the channel which conveys the encoded video (and encoded audio if desired) signals. This signal may be conveniently amplitude modulated upon the audio carrier.

The method and means of encoding the signal are not within the scope of this invention. However to facilitate the discussion, given below, of the details of the encoding and decoding equipment which do constitute parts of this invention, an audio encoding system has to be assumed. A preferred system is one wherein the frequency modulated audio carrier is transposed from its normal position at 4.5 MHz above the video carrier frequency, to another location within the channel. A preferred location is at 1.01 MHz below the video carrier frequency although other locations can be considered.

All modern television receivers employ intercarrier methods for recovering audio as a carrier at 4.5 MHz from the final IF detector. The 4.5 MHz IF audio carrier is the difference frequency between the 45.75 MHz IF video carrier and the 45.25 MHz IF audio carrier. This carrier is then amplified at 4.5 MHz and demodulated, usually in a discriminator circuit.

By moving the audio carrier to a different location in the transmitted channel with respect to the video carrier, the 4.5 MHz intercarrier detector circuits of a normal TV receiver cannot function. If for example the preferred intercarrier difference frequency of 1.0 MHz is chosen for the encoded audio, that will be the frequency developed at the final IF dectector, this frequency cannot be amplified and demodulated by the following 4.5 MHz audio processing circuits of the television receiver. Nor can the second, third, fourth and fifth harmonics at 2.0, 3.0, 4.0, and 5.0 MHz which may be generated by the non-linear action of the receiver detector.

FIG. 7

Figure 7:
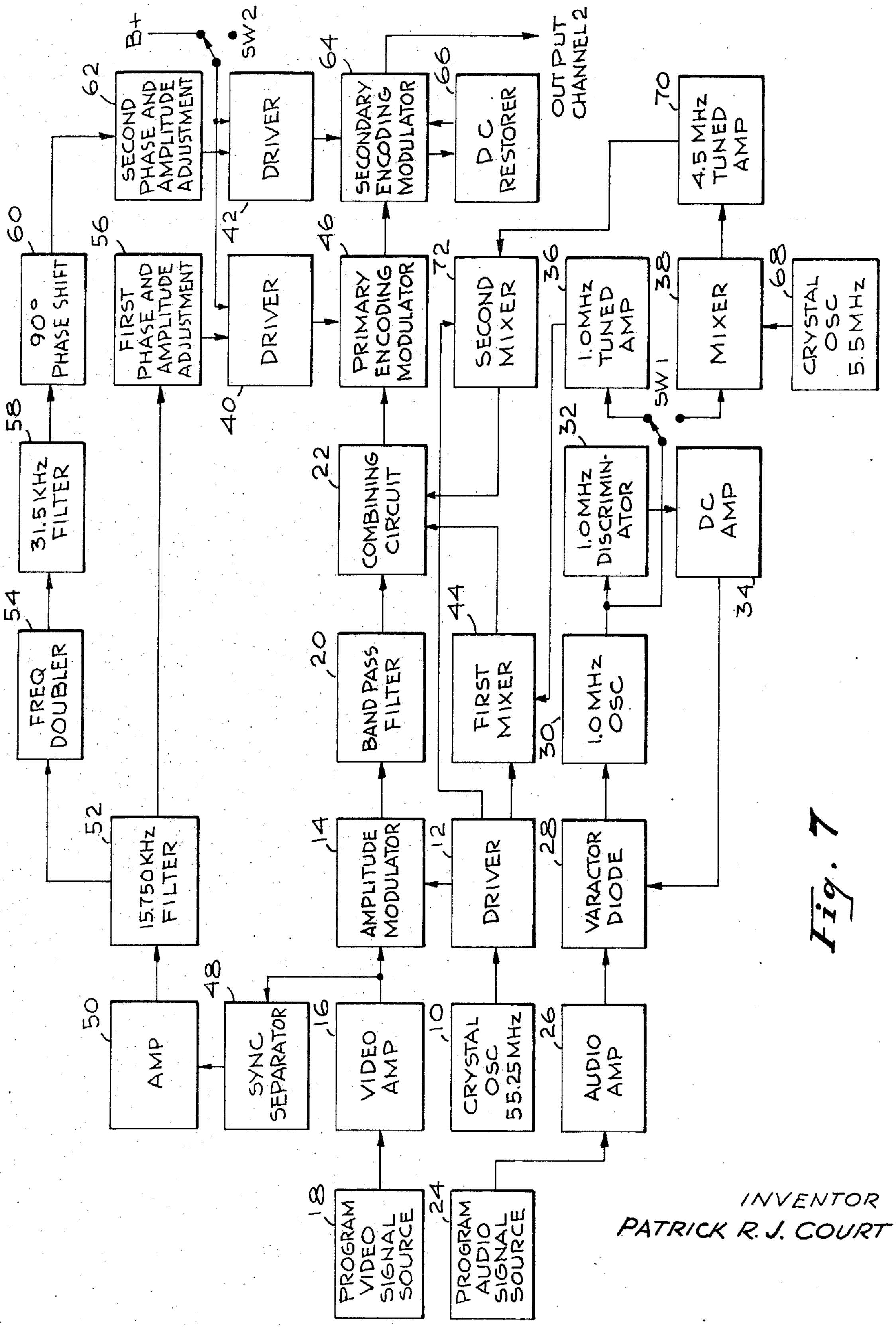
FIG. 7 is a block schematic diagram of an encoder/modulator in accordance with this invention.

FIG. 7 is a block diagram of an encoder/modulator in accordance with this invention which operates in accordance with the principles disclosed above. The circuit shown is positioned between the video and audio program signal sources and the output to cable or cable matrix circuit. By way of illustration but not to be considered as a limitation upon the invention the encoder/modulator of FIG. 7 is assumed to have a composite output at channel 2 (54–60 MHz). The video carrier of channel 2 is at 55.25 MHz and the audio carrier is at 59.75 MHz.

A crystal oscillator 10, at 55.25 MHz excites a driver 12, which has three outputs, one of which is coupled to amplitude modulator 14, which also accepts amplified video input signals from a video amplifier 16, fed from a program video signal source 18. The output of modulator 14, is applied to a bandpass filter 20, which provides vestigial sideband attenuation and generally shapes the video passband to a desired response. The output of bandpass filter 20 is applied to a combining circuit 22. Program audio from a signal source 24, is applied to an audio amplifier 26 whose output varies the bias of a varactor diode 28. This serves to frequency-modulate a 1.0 MHz oscillator 30. Frequency accuracy of oscillator 30 is assured by a control loop comprising a 1.0 MHz discriminator 32 and a DC amplifier 34. The amplifier 34 applies a correcting bias to diode 28 which is referenced to the "S" curve of discriminator 32.

Through the agency of a switch SW1, the output of oscillator 30 which is both frequency-modulated with audio and frequency-corrected, is coupled either to a 1.0 MHz tuned amplifier 36 or to a mixer 38. SW1 is ganged with a switch SW2 so that when switch SW1 is connected to the amplifier 36, ganged switch SW2 is connected to provide B+ to driver stages 40 and 42, thus enabling them.

When switch SW1 is connected to amplifier 36, the amplifier output is applied to a first mixer 44, which receives a second input from driver 12. The output of the first mixer is 55.25 MHz − 1.0 MHz=54.25 MHz which is the usual frequency-modulated audio carrier for the example assumed. The output of the first mixer 44 is applied to combining circuit 22 which also receives the modulated video carrier from the output of the filter 20. Combining circuit 22 output is one input to a primary encoding modulator 46.

The output from the video amplifier 16 also drives a sync separator 48 which in turn drives an amplifier 50. The output of the amplifier 50 comprises both horizontal sync pulses at 15.750 KHz and vertical sync pulses at 60 Hz. A high Q filter 52 forms a 15.750 KHz sinewave from the horizontal sync pulses. This is applied both to a frequency doubler 54 and to a first phase and amplitude adjuster 56. The output from the frequency doubler 54 is applied to 31.5 KHz filter 58. Filter 58 output is a sinewave at 31.5 KHz which is shifted 90° in phase by a 90° phase shift circuit 60 to form a cosine wave at 31.5 KHz. This is applied to a second phase and amplitude adjuster 62.

The outputs of the first and second phase and amplitude adjusters are respectively applied to drivers 40 and 42 which, in accordance with this invention, in turn, respectively apply the 15.75 KHz sinewave encoding signals and 31.5 KHz cosine encoding signals to a primary encoding modulator 46 and to a secondary encoding modulator 64.

With the switch positions of switches SW1 and SW2 as shown in FIG. 7, the inputs to the primary encoding modulator 46 comprise a 55.25 MHz carrier, amplitude modulated with video, plus a 54.25 MHz carrier, frequency-modulated with audio. In the first and second encoding modulators 46 and 64 both of these carriers are also successively amplitude- modulated with the 15.750 KHz sinewave and the 31.5 KHz cosine wave. First and second phase and amplitude adjusting circuits respectively 56 and 62 allow proper adjustment of the phase and amplitude of the 15.75 KHz and 31.5 KHz modulating signals in accordance with reasons given in the preceding analysis. The outputs from both drivers 40 and 42 are AC coupled respectively to modulators 46 and 64. However the required DC component in the secondary encoding modulation is created by a DC restorer 66 which is coupled to the second modulator 64.

It will be noted from FIG. 7 that both the video and audio carriers are simultaneously modulated with the encoding signals. This assures that any non-linearity in the modulators is equally impressed upon both carriers. It also assures that any adjustment of phase and amplitude is equally impressed upon both carriers. The importance of this arrangement will be discussed later.

When ganged switches SW1 and SW2 are in the opposite positions to those shown, B+ is denied to drivers 40 and 42 and no encoding signals are applied to the two encoding modulators 46 and 64. The output of the 1.0 MHz oscillator 30 is connected to mixer 38 which has a second input from a 5.5 MHz crystal oscillator 68. The output of mixer 38 is thus 5.5 − 1.0 = 4.5 MHz which is applied to a 4.5 MHz tuned amplifier 70. Amplifier 70 output drives a second mixer 72. The output of the second mixer 72, which also receives a 55.25

MHz input from driver 12 is then 55.25 + 4.5 = 59.75 MHz which corresponds to the normal non-encoded frequency of the audio carrier. This carrier is combined in combining circuit 22 with the modulated video carrier received from filter 20. As no subsequent encoding modulations are now applied to these carriers, the final output from the secondary encoding modulator 64 is a standard television channel.

The encoder/modulator block diagram of FIG. 7 thus provides two modes of operation. One is the standard or non-encoded mode and the other is an encoded mode, in accordance with this invention. Actuation of the ganged switch combination SW1 and SW2 permits instant changeover from one mode to the other.

The composite output of the encoder/modulator of FIG. 7 is matrixed, using well known combining techniques, with other channels on the cable distribution system, which may also be either encoded or non-encoded in a like manner, depending upon circumstances.

Figure 8:
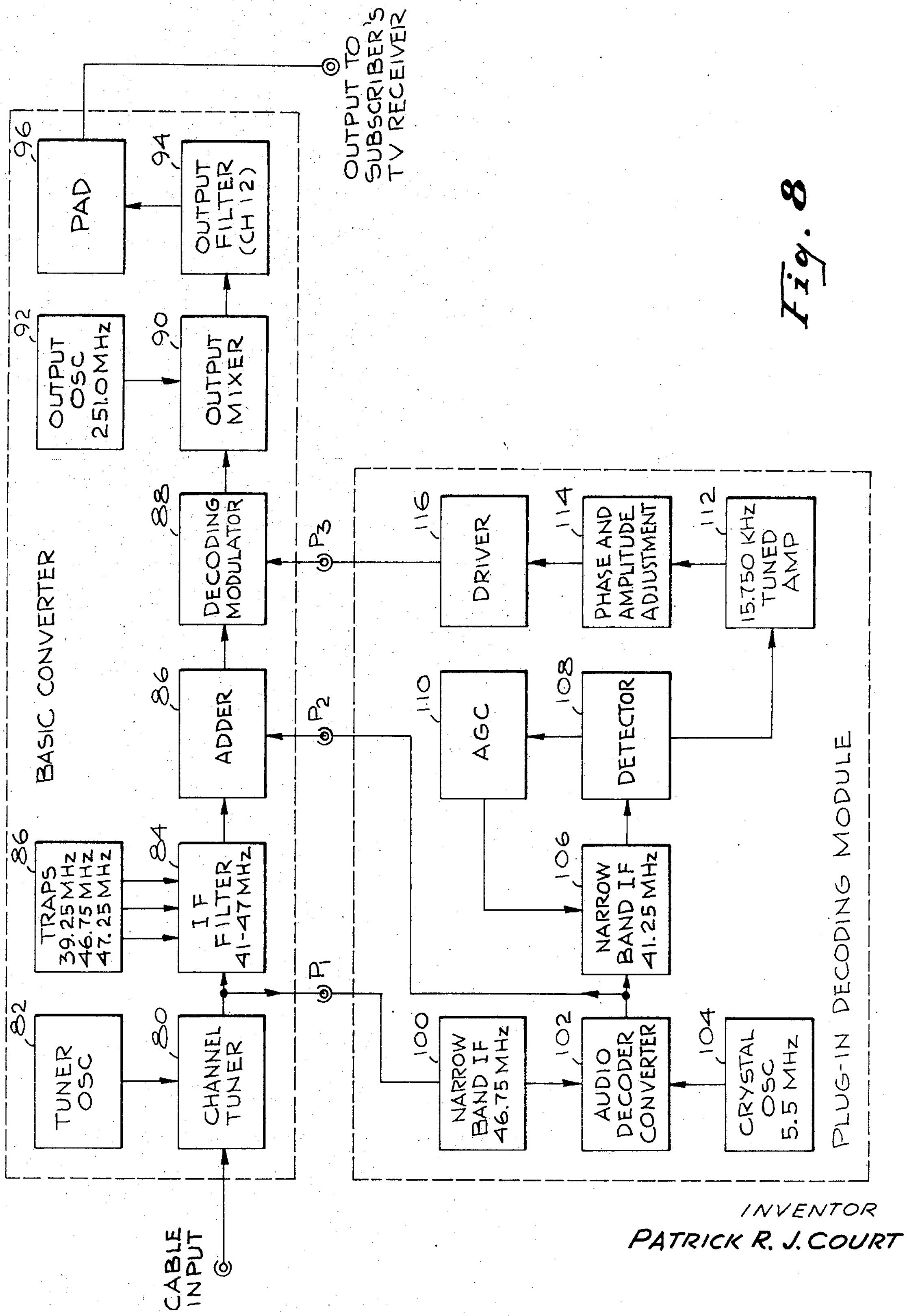
FIG. 8 is a block schematic diagram of a converter/decoder in accordance with this invention.

Reference is now made to the block diagram in FIG. 8 which discloses a converter/decoder in accordance with this invention, located at the receiving apparatus of a subscriber to the system. This preferably comprises an attachment to a subscriber's television receiver. It could, of course, comprise part of the television receiver itself. FIG. 8 really comprises two parts. Part A represents a basic subscriber converter which he requires if he is to receive channels at non-standard (as well as standard) channel frequencies. Part B represents a plug-in decoding module which permits his converter to be readily adapted to decode transmissions encoded in the manner described exhaustively above.

A channel tuner 80, which receives the input from the cable distribution system, contains preselection circuits to select both the standard and non-standard frequency channels offered on the system. Tuner 80 also has an input from a tuner oscillator 82 which serves to heterodyne the input channels to a suitable intermediate frequency (IF). The preferred IF is the standard television IF band, 41–47 MHz, although this is not a restriction. In the standard IF band, the video carrier has a frequency of 45.75 MHz and the audio carrier has a frequency of 41.25 MHz.

The output of tuner 80, is passed to a 41–47 MHz IF filter 84 which has associated with it three trap circuits 86. The 39.25 and 47.25 MHz traps respectively attenuate the adjacent video and audio carriers. The 46.75 MHz trap attenuates the encoded audio carrier, if present, so that it does not give rise to visible heat interference with the video carrier.

The output of filter 84, which consists only of the 45.75 MHz video carrier and its sidebands plus the 41.25 MHz audio carrier if a non-encoded transmission is being received, is passed to adder 86 which may be a simple resistive matrix. The output of adder 86 is applied to a decoding modulator 88, the output of which is applied to an output mixer 90. Mixer 90 has a second input from an output oscillator 92, the frequency of which is such as to allow mixer 90 to convert its IF input to a desired output channel. This could be any suitable channel, but for the sake of illustration, channel 12, has been chosen, requiring an output oscillator frequency of 251.0 MHz.

The output of mixer 90 first passes through a filter 94, to attenuate spurious frequencies, and thereafter through a matching pad 96, which serves to provide output impedance matching. The output of the pad 96 connects directly to the antenna terminals of the subscriber receiver.

The Part A circuits represented thus far serve to select and convert channels on the cable to an intermediate frequency and then to convert them to an unused standard TV channel. The presence of adder 86 and decoding modulator 88 in this context contribute nothing to the functions of what is otherwise a normal CATV converter. However, neither do they detract from these functions.

The remaining circuitry to be described respectively comprise the elements of a plug-in decoding module (Part B), which, through the agency of plug-in contacts P1, P2, and P3, allow the converter described above to additionally provide decoding capability.

Through P1 the output of the tuner 80 also is applied to a narrow band IF amplifier 100 with a center frequency of 46.75 MHz. This amplifier accepts only the encoded 46.75 MHz audio carrier and drives an audio decoder converter 102, which has a second input from 5.5 MHz crystal oscillator 104. The output of converter 102 is chosen as 46.75 − 5.5 = 41.25 MHz, which is the standard audio IF carrier frequency. This is connected back to the adder 86 through plug-in connector P2, where it is combined with the video carrier. It is also connected to the input of a high gain, narrow band 41.25 MHz IF amplifier 106, which in turn drives a detector 108. Detector, 108, is an amplitude demodulator whose primary function is to recover the decoding modulation which is conveyed upon the audio carrier as an amplitude modulation. It also furnishes an input to the AGC circuits 110 which serve to control the gain of amplifier 106 and maintain a constant output from detector 108.

The output of detector 108 comprises both the primary encoding signal at 15.750 KHz and the lesser secondary encoding signal at 31.5 KHz. Since the 15.750 KHz signal is desired, the output of detector 108 is passed through a narrow band amplifier 112 with a center frequency of 15.750 KHz, which therefore rejects the unwanted 31.5 KHz component. The wanted 15.750 KHz signal is passed through phase and amplitude adjusting circuits 114 to a driver circuit 116, and thence, through plug-in contact P3, to the decoding modulator 88. Phase and amplitude adjusting circuits 114, enable precise adjustments of the phase and amplitude of the decoding modulation so that it is in exact opposition with the composite encoding modulation of the video (and accompanying audio) carrier in decoding modulator 88, and therefore cancels the encoding modulation.

With the plug-in decoding module engaged, therefore, the output of decoding modulator 88, comprises a video carrier which is normal, except for the miniscule, four-times frequency error component, amounting to less than 1 percent, as detailed above. It also comprises a normal frequency-modulated audio carrier with its additional amplitude modulation cancelled to the same degree. These decoded carriers are then processed by the remainder of the converter and then delivered to the subscriber receiver as a normal channel.

Without the engagement of the plug-in decoding module, via contacts P1 through P3, the encoded transmission would be delivered to the subscriber receiver in encoded form. Normal transmissions would, however, be passed on to the subscriber receiver unmodified.

With the decoding module engaged, encoded transmissions are decoded and non-encoded transmissions are passed to the subscriber receiver unmodified. When the audio IF carrier is in its normal frequency location at 41.25 MHz, there is no input to, or output from, the narrow band IF circuit 100 and therefore there are no inputs either to adder 86 or modulator 88. Standard transmissions are therefore processed normally, either with or without the engagement of decoding module (B).

The AGC circuit 110 in FIG. 8 maintains constant the carrier level at detector 108. The detected decoding signal is also therefore maintained constant, for any given depth of modulation at the transmitter, regardless of variations in signal level at the input to the converter/decoder. This assures constancy of the modulation depth of the the decoding function even though the input signals may vary.

If adjustments of phase and amplitude of the encoding modulation functions are made at the transmitter, these will affect the modulation envelope of both the video and audio carriers. As these are ultimately caused to oppose each other in the decoder, decoding remains complete, in spite of such adjustments at the transmitter. To illustrate this, suppose that the depth of modulation of the primary encoding function is slightly increased at the transmitter through the agency of the first phase and amplitude adjuster 56 in FIG. 7. The increase the be experienced equally by both video and audio carriers. Thus, in the converter/decoder, the decoding signal output from detector 108 in FIG. 8 will also increase, even though the AGC circuit 110 maintains the average carrier level constant into the detector 108. In the decoding modulator 88, the increase in the amplitude of the decoding signal serves to cancel the increase in amplitude of the encoding modulation, to which it is proportional. Thus effective decoding is maintained.

Similarly, any non-linearity in the primary encoding modulator is impressed upon both the video and audio carriers. In the decoder these nonlinearities also tend to cancel, due to the opposition of the encoding and decoding modulations.

It is for these reasons that the simultaneous encoding modulation of both video and audio carriers, in the same encoding modulator, is very important.

With the continuous sinewave function chosen herein for encoding and decoding in the system of this invention, the required relative timing accuracy between the decoding signal and encoded signal is quite non-critical. In fact, a relative timing error of up to 5 percent can be tolerated without difficulty. Thus the relative timing requirements are much less critical in this new system, than with previously known "grey sync" systems.

It was previously mentioned that, while the primary encoding modulation is preferably synchronous with the horizontal sync information, it could also be an exact multiple of that frequency. The pros and cons of these choices will now be weighed. The assumption, of course, is that the phase of the encoding sinewave is chosen so that horizontal sync is depressed in amplitude, and that the intervening video information is enhanced.

The relative merits of using 31.5 KHz for encoding as compared with 15.750 KHz will be discussed with reference to FIGS. 9A, 9B and 9C.

There are two initial considerations:

1. The effect upon the vertical sync and blanking interval.
2. The effect upon the scrambling.

Figures 9A, 9B, 9C:
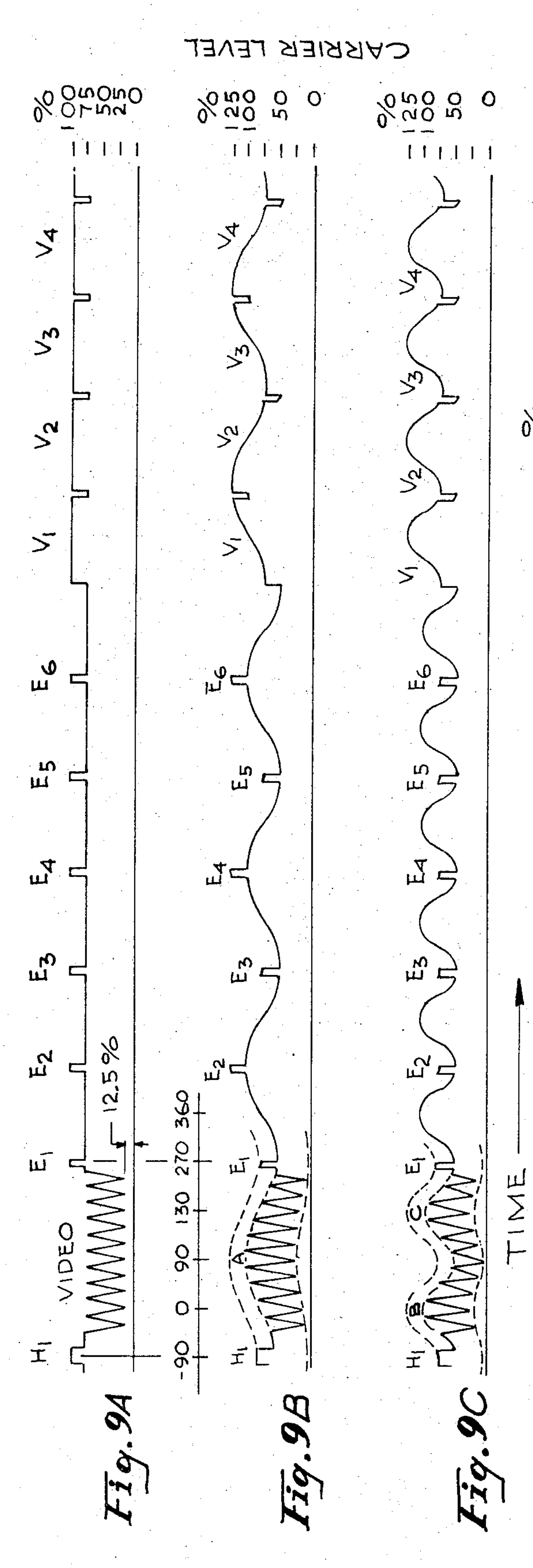
FIGS. 9A, 9B and 9C respectively are waveforms respectively indicating a portion of the vertical interval prior to encoding, the same interval encoded with a 15.75 KHz wave, and the same interval encoded with 31.5 KHz wave.

FIGS. 9A, 9B and 9C

FIG. 9A shows a portion of the vertical inverval prior to encoding. FIG. 9B shows the same portion of the vertical interval encoded with a primary encoding sinewave of 15.750 KHz. FIG. 9C shows the same portion of the vertical interval encoded with a primary encoding sinewave of 31.5 KHz.

In FIGS. 9B and 9C, a value of $m$ of 0.25 is chosen.

The portion of the waveform depicted in FIGS. 9A, B, and C, includes one horizontal sync pulse $H_1$, one line of video information, six preequalizing pulses $E_1E_2E_3E_4E_5E_6$ and four segments of the vertical sync pulse $V_1V_2V_3$ and $V_4$.

When encoded with a primary encoding sinewave of 15.750 KHz, it will be noted that every other equalizing pulse is enhanced beyond 100 percent. The odd pulses $E_1E_3E_5$ are suppressed to the same level as suppressed horizontal sync $H_1$, while the even pulses $E_2E_4E_6$ are enhanced beyond 100 percent peak carrier. When 31.5 KHz is used for encoding, all pre-equalizing pulses are suppressed as shown in FIG. 9C. The same remarks apply to the six post-equalizing pulses (not shown).

In the case of the vertical sync segments $V_1$ $V_2V_3V_4$, there is not too much to choose between FIGS. 9B and 9C, except that the 15.750 KHz horizontal sync information contained in the vertical sync serrations is all suppressed. The enhancement of portions of the vertical sync itself beyond 100 percent carrier, cannot be avoided however if a continuous encoding sinewave is employed (which is eminently desirable).

From the standpoint of the treatment of the entire vertical sync interval it appears preferable to employ 31.5 KHz for encoding. The use of this frequency minimizes the total amount of the vertical sync and blanking interval which is enhanced beyond 100 percent and achieves maximum suppression of horizontal sync information during this period. Carrier enhancement beyond 100 percent is confined to the three-line vertical sync interval only.

Fortunately, this unavoidable enhancement of small portions of the vertical sync interval beyond 100% carrier has little consequence for the cross-modulation characteristics of the cable distribution amplifiers. Unlike the situation wherein horizontal sync is enhanced beyond 100 percent, perhaps on several channels, the statistical percentage of time when several "super-enhanced" three-line vertical sync intervals (out of 262.5 actual lines-neglecting interlace) come into coincidence and therefore amplitude-augment each other, is trivial. Cross-modulation in system distribution amplifiers as a result of super enhanced vertical sync may therefore be neglected.

With regard to the effect upon scrambling the picture, it is noted that when 15.750 KHz encoding is employed there is a tendency to enhance video into the "-superblack" region (between 75 percent and 100 percent) in a specific region designated as "A" in FIG. 9B. While the video information itself will vary in amplitude within this region in an unpredictable manner, the synchronizing circuits of a television receiver, without a decoder, will obviously tend to respond to video information in this region. The tendency therefore will be for the picture to synchronize with the horizontal "sync bar" in various locations, but concentrated in the central portion of the screen. On still pictures, and test patterns, the picture may synchronize with a virtually stationary central sync bar. With moving video, the sync bar will appear very jagged or may even break up altogether.

With the 31.5 KHz encoding frequency, there are two regions, "B" and "C" in FIG. 9C, where video tends to be enhanced into the superblack region, so depending upon the caprices of the varying video, the receiver may tend to lock in either of these two regions, or jump from one to the other. In the case of video in which there is considerable movement, the scrambling may thus appear to be very effective as the horizontal lock shifts from one region to another. In the case of stationary pictures or test patterns however, the scrambling may appear to be less effective, because the sync bar will tend to appear relatively stationary either to the right of the picture or the left, and more of the picture may be visible for long periods.

The judgment as to effectiveness of scrambling is very subjective and has to be made on the basis of prolonged observation with many different kinds of video information and program content. Both the 15.750 KHz and the 31.5 KHz encoding are very destructive of the entertainment and intelligence contained in the picture, but it is clear that stationary pictures are more disturbed by the 15.750 KHz encoding while moving pictures are more disturbed by the 31.5 encoding.

Without resort to additional measures, the choice is difficult. When considering all of the factors however, including the effects of encoding upon the vertical sync interval, the weight appears to be in favor of 31.5 KHz.

There appears to be little to gain from employing a primary encoding frequency higher than 31.5 KHz. A frequency of 47.25 KHz ($3x$) creates the same kinds of problems in the vertical sync interval that exist with 15.750 KHz. A frequency of 63.0 KHz ($4x$) yields much the same result that obtains with 31.5 KHz, with one additional disadvantage. There will be a tendency, because of the slope of the higher frequency wave, to enhance the back porch of horizontal sync and blanking into the superblack region where it forms a convenient prominence for synchronization. This is something to be avoided.

The general conclusion is that the preferred choice for the primary encoding frequency is 31.5 KHz.

All observations regarding modulation depth, secondary correction, encoding figure of merit, etc., that were previously made with regard to 15.750 KHz apply equally to 31.5 KHz. The secondary encoding modulation in this case of course would be a cosine wave with a frequency of 63.0 KHz.

The use of 31.5 KHz as a primary encoding frequency does however permit the addition to another very important encoding element. This element may best be described as "enforced scrambling" and it results in a reinforcement of the natural encoding or scrambling characteristics, result from the enhanced-video/suppressed-sync relationship, particularly during periods when the video content is relatively stationary.

The preferred method comprises the introduction, at the transmitter of an additional cosinewave modulation component, preferably through an additional encoding modulator. The frequency of this additional component is ideally exactly one half of the primary encoding modulation and the required degree of modulation is relatively low (on the order of 0.1). The enforced scrambling element is obtained by additionally phase-modulating a 15.750 KHz cosinewave by exactly ±90°, using a square wave modulation function which has a relatively low frequency (i.e., on the order of 10 to 20 Hz). Additionally, as will be shown later, this square wave modulation function is preferably an exact submultiple of the 60 Hz vertical frequency, and the rise and fall times of the square wave are preferably in phase coincidence with the vertical sync and blanking interval of the video signal to be encoded.

For ease of understanding there will first be considered the encoding modulations as applied to a steady carrier, not previously modulated with the complex video waveform. Subsequently the analysis will be extended to a video-modulated carrier.

Figures 10, 10A, 10B, 10C, 10D:
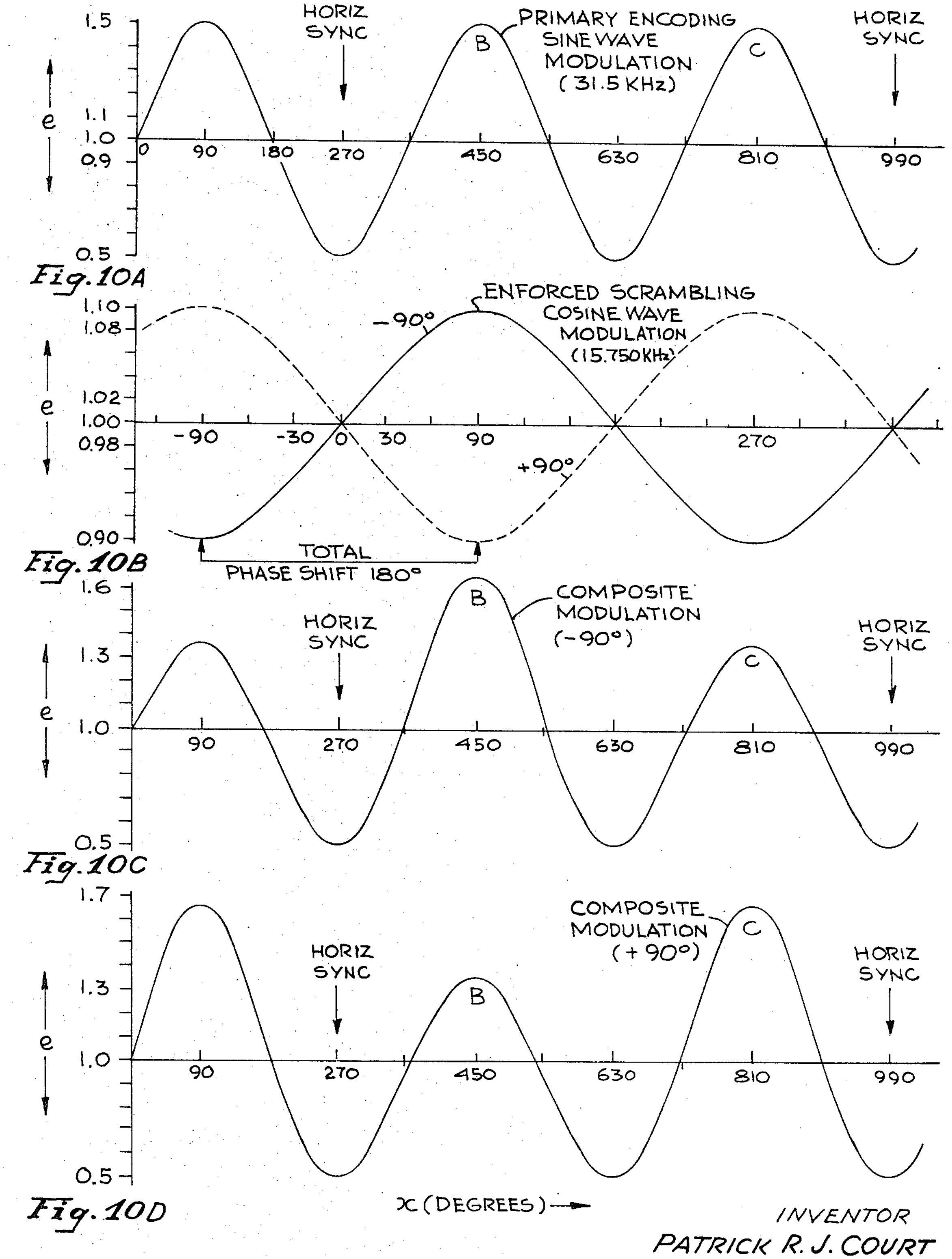
FIGS. 10A, 10B, 10C and 10D illustrate modulation envelopes resulting from the application to an unmodulated carrier wave of the several modulation processes used herein.

FIGS. 10A, 10B and 10C

Attention is now called to FIGS. 10A, B, C and D which are graphical representations of the modulation envelopes resulting from the several encoding processes.

FIG. 10A is a graphical plot of the modulation envelope resulting from the primary encoding sinewave modulation which is now 31.5 KHz, or twice the horizontal frequency. For simplicity, it is assumed that $m$ is 0.5 and the presence of the secondary encoding cosinewave modulation which, in this case, would have a frequency of 63.0 KHz, is ignored. Its presence should be assumed however, as it does not in any way detract from this discussion.

With a modulation degree of 0.5, the primary encoding modulation envelope is shown to have a minimum value of 0.5 and a maximum value of 1.5. Horizontal sync occurs during every other negative trough of this modulation envelope, as indicated. Enhanced video occurs in two regions, designated by (B) and (C).

FIG. 10B illustrates the two phases of the enforced scrambling cosinewave modulation envelope which are at ±90°. They are thus 180° apart, or in antiphase with each other. The solid curve illustrates the phase at −90° while the dotted curve illustrates the phase at +90°. The degree of modulation chosen for this modulation function is 0.1, and it results in an envelope extending from 1.1 to to 0.9 relative to the mean carrier value of 1.0.

The curve shown in FIG. 10C is the product of the curve in FIG. 10A and the solid curve in 10B. The curve in FIG. 10D is the product of the curve in FIG. 10A and the dotted curve in FIG. 10B.

It will be noted that these curves both have constant negative trough values of 0.5, which is the same as for curve 10A. Thus the level of the depressed sync is unchanged by this additional modulation. It will also be noted however that the peaks of the resultant envelope, corresponding to enhanced video in regions (B) and (C) are alternately depressed and elevated in FIGS. 10C and 10D as a function of the two ±90° phases of the enforced scrambling cosinewave modulation depicted in FIG. 10B.

Figure 11A:
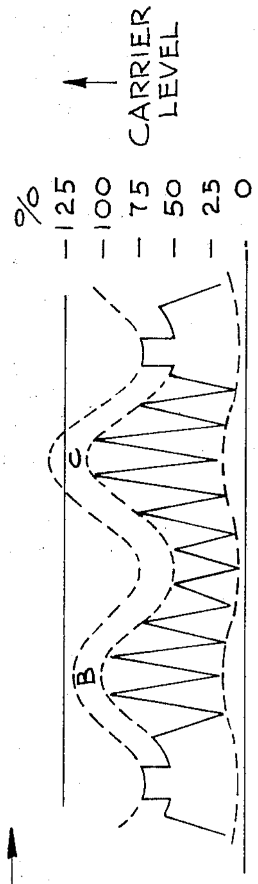
FIGS. 11A and 11B illustrate the effects of modulating a carrier, previously modulated with video, first with 31.5 KHz sine wave and thereafter respectively with a 15.75 KHz sine wave and then with a 15.75 KHz sine wave shifted 90°.
Figure 11B:
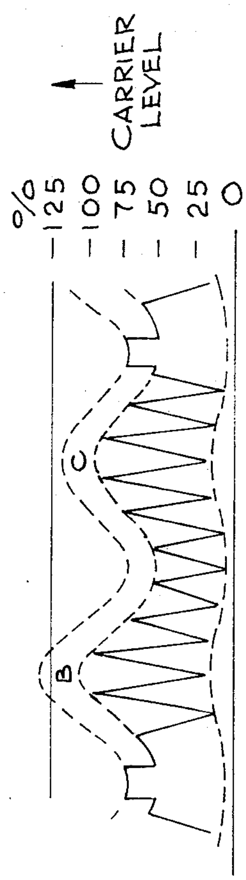

FIGS. 11A and 11B

FIGS. 11-A and 11B illustrate the effect of this composite encoding modulation upon a carrier, previously modulated with video, as a function of the two phases of this additional encoding modulation. Horizontal sync is shown to remain at a constant suppressed amplitude, while video is alternately shown to be more or less enhanced in regions (B) and (C), as a function of the two phases of the enforced scrambling modulation.

The effect of this additional encoding modulation is quite dramatic when video information with relatively little movement is being conveyed. The sync separator in a subscriber receiver favors that portion of the video waveform which is most prominent, which of course is normally sync information. When sync is suppressed and video enhanced however, the sync separator favors the most prominent portion of the enhanced video. With two enhanced regions of video, as at regions (B) and (C) in FIG. 11, and with relatively "stationary" video, either one or the other could be favored for long periods. However, when the regions (B) and (C) are alternately made more or less prominent at a disturbing low frequency rate, the sync separator will favor each alternatively. The effect is therefore for the picture to alternatively synchronize within the elevated video regions (B) and (C). These create two alternating "sidelock" conditions, one towards the left and other towards the right of the screen. This results in extremely effective scrambling.

When the video signal contains a lot of "movement," the two enhanced regions (B) and (C) arbitrarily vary in amplitude with respect to each other, as a function of the video itself and with a ratio which greatly exceeds that resulting from the enforced scrambling mode. In this case the enforced scrambling mode simply contributes to the resultant confusion. In other words, picture scrambling with "still" video is dramatically enhanced and picture scrambling with "moving" video is even better.

Experiments have shown that video information, encoded with the composite sinewave modulations described above, results in displayed images which are completely scrambled and have no remaining entertainment value.

The preferred rate at which the phase of the enforced scrambling sinewave modulation is shifted ±90° is in the order of 10 to 20 Hz. An ideal frequency is 15 Hz, which is the vertical rate divided by four. With this rate, the scrambling efficacy is such as to be physically and psychologically distracting to normal viewers.

FIG. 12

Figure 12:
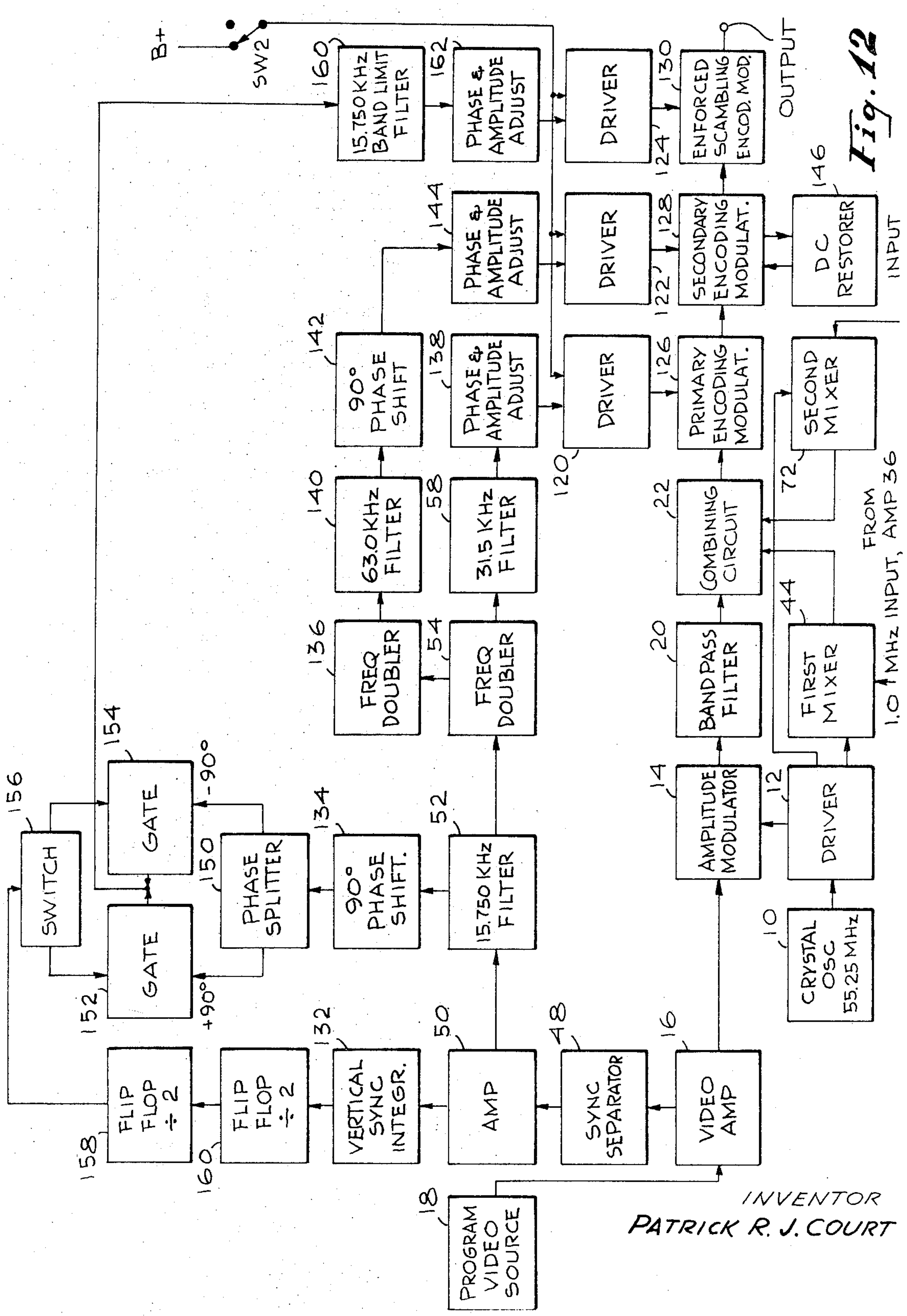
FIG. 12 is a block schematic diagram of the video encoding portion of an encoder/modulator in accordance with another embodiment of this invention.

FIG. 12 shows a block diagram of the video encoding portions of the encoder/modulator of FIG. 7, which have been modified to provide the additional enforced scrambling encoding modulation described above. The circuitry associated with audio carrier generation and encoding shown in FIG. 7 has been deleted from FIG. 12 for simplicity and clarity. However, circuits performing similar functions as in FIG. 7 will receive the same reference numeral.

In FIG. 12, the encoder/modulator is shown operating in the encoding mode, with switch SW2 providing B+ to the three drivers 120, 122 and 124, thus enabling them. The first mixer 44 also receives a 1.0 MHz audio frequency modulated second input as a consequence of the operation of switch SW1 (as shown in FIG. 7). Also, there is no second input to the second mixer 72.

The crystal oscillator 10 generates a 55.25 MHz signal, corresponding to the video carrier frequency for channel 2, which is chosen for illustration. This is amplified by the driver 12 which drives an amplitude modulator 14 as well as first and second mixers 44 and 72. Because of the audio frequency-modulated second input to the first mixer, a frequency-modulated audio carrier output is obtained from the first mixer which is applied as one input to combining circuit 22. The frequency of this carrier is 55.25 − 1.0 = 54.25 MHz, which is the encoded frequency location of the audio carried. The second mixer 72 is inoperative because it receives no second input, and therefore cannot furnish an output to the combining circuit.

A standard video signal is applied from the program video source 18 to a video amplifier 16. The output of video amplifier 16 is applied as a second input to amplitude modulator 14, the output of which is a normal, video-modulated 55.25 MHz carrier. Band-pass filter 20 provides vestigial sideband attenuation and other shaping of the video carrier sidebands, and delivers the video-modulated carrier to combining circuit 22 where it is combined with the transposed audio carrier. Thse two signals successively pass through three encoding modulators respectively primary 126, secondary 128 and enforced 130, the output from which is the output of the encoder/modulator.

A second output from video amplifier 16 drives a sync separator 48, the output of which is composite sync, comprising both horizontal and vertical pulses. These are amplified in an amplifier 50 and applied to both a 15.750 KHz filter 52 and to a vertical sync integrator 132. The output of the filter 52 is a 15.750 KHz sinewave, which is applied to both a frequency doubler 54 and to a 90° phase shift circuit 134. The output of frequency doubler 54 is a 31.5 KHz sinewave which is applied to a 31.5 KHz filter 58 and to a second frequency doubler 136. The 31.5 KHz sinewave is adjusted both in phase and amplitude in phase and amplitude adjusting circuits 138 and applied to the primary encoding modulator 126 through the enabled driver 120. Thus the primary encoding envelope of 31.5 KHz is applied to the previously modulated video and audio carriers in phase synchronism with horizontal sync, and with the phase such as to depress horizontal sync and to enhance the video information in two regions in between.

The output of the second frequency doubler 136 is a 63.0 KHz sinewave which is passed through a 63.0 KHz filter 140 to a 90° phase shift circuit 142. This circuit therefore creates a 63.0 KHz cosinewave, which is adjusted in phase and amplitude by circuits 144 before being applied to the enabled driver 122. DRiver 122 applies this adjusted signal to the secondary modulator 128 as the secondary encoding modulation. The relative phases and amplitudes of the primary and secondary encoding modulations are adjusted in accordance with the very detailed analysis given earlier in relation to a primary encoding modulation frequency of 15.750 KHz and a secondary encoding modulation frequency of 31.5 KHz. The same principles and concepts apply equally in this case where the primary encoding modulation frequency is now 31.5 KHz, and the secondary encoding modulation frequency is 63.0 KHz. An appropriate value of $m$ for the 31.5 KHz primary encoding sinewave of 0.3. The value of $m$ for the 63.5 KHz secondary encoding cosinewave is then $0.5m^2$ which is 0.045, yielding a peak to peak envelope value of 0.09. This signal is DC restored in restorer 146.

The second output of 15.750 KHz filter 52 is applied to a second 90° phase shift circuit 134, to create a cosinewave of frequency 15.750 KHz. From this signal, a phase splitter 150 creates a +90° cosine wave and −90° cosine wave, which signals are of course in antiphase with each other. These two signals are applied separately to into gates 152, 154 which are actuated by a switching circuit 156, such that when gate 152 is open, gate 154 is closed, and vice versa.

The switch 156 is actuated by the output of a 2 flip-flop 158 which is in turn driven by a 2 flip-flop 160. Flip-flop 160 is triggered by the vertical sync output of integrator 132 which is driven by the second composite sync output from amplifier 50.

Thus the 60 Hz vertical sync pulses are formed into a 30 Hz squarewave by flip-flop 160 and this is formed into a 15 Hz squarewave by flip-flop 158. The switch 156 therefore alternately opens and closes gates 152 and 154 at a 15 Hz squarewave rate, which is the preferred switching rate discussed earlier. The outputs of the two gates 152 and 154 are combined and the combined output comprises a 15.750 KHz cosinwave, the phase of which is switched ±90° at a 15 Hz rate. It will also be noted that switching occurs during the vertical retrace interval, because the switching is initiated by vertical sync.

This signal constitutes the enforced srambling encoding signal and is applied to the enforced encoding modulator 130 through a band limiting filter 160, phase and amplitude adjusting circuits 162, and the enabled driver circuit 124. The value of $m$ for this modulation is relatively small, being on the order of 0.1, as discussed previously in connection with FIGS. 10A, B, C and D and 11A and B which show the individual modulation envelopes and their combinations. FIG. 10C and FIG. 11B show the composite modulation envelope when gate 154 is opened. FIGS. 10D and 11A show the composite modulation envelope when gate 152 is opened. It should be remembered, during the discussion of the converter/decoder which follows, that this composite encoding envelope is amplitude modulated equally and simultaneously upon both the video and audio carriers.

Figure 13:
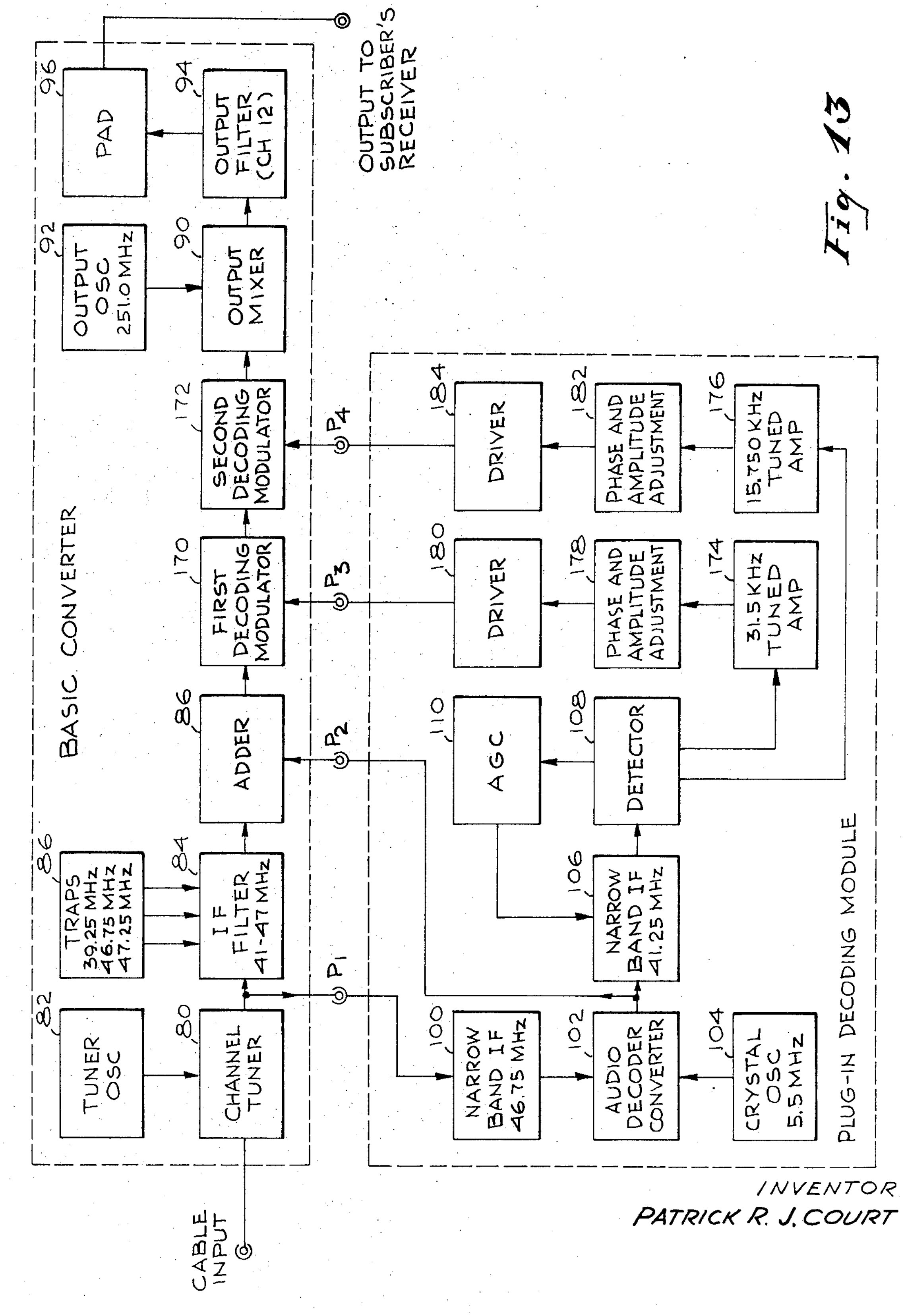
FIG. 13 is a block schematic diagram of converter/decoder required for decoding encoded signals received from the circuit of FIG. 12.

In contrast with the additional complexities at the encoder/modulator, when comparing FIGS. 7 and 12, the enforced scrambling feature requires very little additional circuitry in the converter/decoder as shown in FIG. 13. A comparison of FIGS. 8 and 13 shows that only three additional circuits are necessary to provide decoding of the enforced scrambling component. This is in keeping with the requirement that the cost of the converter decoder, which is used in large quantities, be reasonable. Additional cost in the encoder/modulator, only one of which is required per channel, is not objectionable.

FIG. 13

Referring now to FIG. 13 there may be seen a block schematic of a converter/decoder which comprises a basic converter (A) and a plug-in decoding module (B) which can be engaged through plug-in contacts $P_1P_2P_3$ and $P_4$. Circuits which function similar to the ones shown in FIG. 8 are given the same reference numerals.

It will be noted that the basic converter now includes two decoding modulators 170 and 172 instead of only one as previously illustrated in FIG. 8. Without the plug-in module engaged, the converter performs the function of selecting channels distri-buted through the cable system both at standard and non-standard frequencies, to converting these to a suitable intermediate frequency, and converting the IF signals to an appropriate output channel which can be tuned by the subscriber's receiver. Non-encoded channels can be viewed normally, while encoded channels yield scrambled pictures and no sound.

When the plug-in decoding module is engaged through $P_1P_2P_3$ and $P_4$, the transposed audio IF carrier at 46.75 MHz is applied by the tuner 80 to a narrow band IF amplifier 100 and applied to the audio decoder converter 102 which has a second input from 5.5 MHz crystal oscillator 104. The output of converter 102 is the difference frequency 46.75 − 5.5 = 41.25 MHz, which is the normal audio IF frequency. This signal is applied to a narrow band 41.25 MHz IF amplifier 106 and is also returned to the basic converter through $P_2$ where it is combined with the video carrier at 45.75 MHz from IF filter 84 in adder 86. The traps 86, associated with filter 84, attenuate the adjacent video and audio carriers, as well as the non-standard frequency audio carrier, into the adder 86.

If the selected channel is encoded, the output of adder 86 comprises a video and audio carrier at correct IF frequencies, which are both equally modulated with the composite encoding modulation described previously. It will also be noted that no AGC acts on amplifier 100, so the level of the audio carrier returned from the decoding module to adder 86 varies proportionately with the level of the video carrier to which it is added, as a consequence of changes of input signal level to tuner 80. Thus the proper amplitude relationship between the two carriers is maintained.

The converted 41.25 MHz signal from audio decoder converter 102 is also amplified in a high gain, narrow band IF amplifier 106 which is AGC controlled through a loop comprising the detector 108 and AGC circuit 110. The average IF carrier signal is thus maintained constant at detector 108, and the detected composite encoding modulation envelope is held constant in amplitude regardless of signal level input to the converter/decoder. This composite envelope comprises three components, the 31.5 KHz primary encoding signal, the 63.0 KHz secondary encoding signal and the ±90° phase shifted 15.750 KHz enforced scrambling signal. The 31.5 KHz signal is accepted and amplified by a 31.5 KHz tuned amplifier 174, while the 15.750 KHz signal is accepted and amplified by 15.75 KHz tuned amplifier 176. The unwanted 63.0 KHz signal is rejected by both amplifiers 174 and 176. Through phase and amplitude adjusting circuits 178 driver 180 and plug contact $P_3$, the 31.5 KHz signal is applied to the first decoding modulator 170 with phase and amplitude such as to oppose and cancel the combined primary and secondary encoding modulation components of the composite encoding envelope. This process was thoroughly analyzed previously. The miniscule error component remaining after this first decoding modulation has an amplitude of substantially less than 1 percent of peak carrier, and a frequency in this case of twice 63.0 KHz = 126.0 KHz. Cancellation is effective on both video and audio carriers.

The 15.750 KHz signal, with its 15 Hz, ±90° phase shift component, is amplified in amplifier 176 and applied to the second decoding modulator 172 through phase and amplitude adjusting circuits 182, driver 184 and plug contact $P_4$. Again the phase and amplitude of this signal is adjusted such as to oppose and cancel the 15.750 KHz component of the composite encoding modulation envelope on both video and audio carriers.

Because of the low value of $m(0.1)$ chosen for the enforced-scrambling 15.750 KHz component, no secondary correction signal is required, either at the encoder/modulator or the converter/decoder. It is to be noted that when $m = 0.1$, the remaining uncancelled fractional error is approximately 0.01 (or 1 percent) which is so small that an additional secondary correction signal is not necessary to assure invisibility in the decoded picture.

The decoding module therefore effectively cancels all elements of the complex encoding signal on both video and audio IF carriers. These are converted to a standard television channel at the output, for viewing by the subscriber.

As all components of the composite encoding (and decoding) signals are phase-synchronous with horizontal sync during active trace time, any tiny uncancelled components are also synchronous with horizontal sync. They therefore appear as stationary vertical blanking of the picture, however with an amplitude of 1 percent or less, which is less than that usually associated with hum and other normal shading components. By virtue of being stationary, their invisibility is assured.

The 15.750 KHz encoding signal component effects its ±90° phase transitions during vertical retrace time, i.e., during a non-visible part of the scan. Any disturbance occurring during these phase transitions therefore remains invisible.

FCC standards require a minimum vertical sync and blanking interval of 18 lines, comprising three lines of pre-equalizing pulses, three lines of vertical sync, three lines of post-equalizing pulses and nine lines of vertical blanking. If it is assumed that each phase transition begins at the beginning of the vertical sync period, and it is wished to be certain that it has ended before the end of vertical blanking the allowable transition time is clearly 15 lines or 15 × 63.0 $\mu$s. This is approximately 950 $\mu$s.

The required bandwidth in the circuits which by the 15.750 KHz signal, in both encoder and decoder, is therefore given by:

$$\Delta F = 2(\delta\theta/\delta t)\cdot(1/2\pi)$$
$$= 2(\pi/950\times10^{-6})\cdot(1/2\pi)$$
$$= (2\pi/2\pi)\cdot(10^6/950)$$
$$= (10^6/950)$$
$$= 1.05 \text{ KHz}$$
$$\approx 1.0 \text{ KHz}$$

This therefore is the minimum bandwidth required by the 15.75 KHz filter 52 and the band limiting filter 160 in FIG. 12 and in the tuned amplifier 176 in FIG. 13. This corresponds to a Q of 15, which is a very practical value. Referring to the band limiting filter 160, in the encoder/modulator of FIG. 12, the bandwidth of this circuit may be deliverately held to 1.0 KHz. This suppresses any very high frequency sidebands resulting from rapid phase transitions consequent to fast rise time switching signals in the two gates 152 and 154. This assures that all phase-modulation sidebands so generated are confined within the channel and can therefore cause no interference outside the channel.

The 15.750 KHz enforced scrambling component may also be a free-running signal with a frequency difference with respect to horizontal sync of 15 Hz, rather than the two-phase frequency-synchronous signal as described above. The enforced scrambling effect is much the same, frequency any noncancelled residue, after decoding, may then be faintly visible because it is no longer stationary. The two-phase, frequency-sychronous signal is therefore to be preferred.

What is claimed is:

1. A system for encoding and decoding video signals modulated on a carrier comprising:

a transmitter having a source of first sinewave signals having a predetermined frequency and phase relationship relative to the freequency and occurrence of the horizontal synchronizing signal portions of said video signals, first means for modulating said video signals modulated on a carrier with said first sinewave signals, a source of second sinewave signals having a predetermined frequency and phase relationship relative to the frequency and phase of said first sinewave, second means for modulating the output of said first means for modulating with said second sinewave, and means for transmitting the output of said second means for modulating, a receiver for receiving said output from said second means for modulating from said transmitter, said receiver having a source of third sinewave signals having the frequency of said first sinewave signals and being in antiphase therewith, and third means for modulating said output from said second means for modulating with said third sinewave signals to substantially restore said video signals modulated on a carrier to their original state.

2. A system as recited in claim 1 wherein the frequency of said first sinewave signals is the same as the frequency of the horizontal synchronizing signals, and the phase of said first sinewave signals is established to reduce the amplitude of said horizontal synchronizing signals by the relatively negative going portions of said first sinewave signals.

3. A system as recited in claim 1 wherein the frequency of said second sinewave signals is twice the frequency of said first sinewave signals.

4. A system as recited in claim 1 wherein the frequency of said first sinewave signals is twice the frequency of the horizontal synchronizing signals, and the phase of said first sinewave signals is established to reduce the amplitude of said horizontal synchronizing signals by the relatively negative going portions of said first sinewave signals.

5. A system as recited in claim 4 wherein at said transmitter there is included a source of a fourth sinewave for having the frequency of said horizontal synchronizing signals and a phase which is periodically switched to be plus or minus 90° out of phase therefrom, and a fourth means at said transmitter for modulating the output of said second means for modulating, at said receiver there being means for generating fifth sinewave signals which are switched to be in antiphase with said fourth sinewave signals, and fifth means for modulating the output of said third means for modulating with said fifth sinewave signals to decode said video signals modulated on a carrier.

6. A system as recited in claim 4 wherein the frequency of said second sinewave signals is twice the frequency of said first sinewave signals.

7. A system as recited in claim 1 wherein said transmitter includes means for generating program audio signals smodulated on a carrier, and means for adding said program audio modulated on a carrier, said first and second means for modulating said video modulated on a carrier modulating said respective first and second sinewaves on said program audio signals modulated on a carrier simultaneously with their being modulated on said video signals modulated on a carrier.

8. A system as recited in claim 1 wherein the modulation index of said first sinewave signals is on the order of 0.3, and the modulation index of said second sinewave signals is on the order of 0.045.

9. A system for encoding video signals modulated on a carrier comprising:

a first source of first sinewave signals having a predetermined frequency relative to the frequency of the horizontal synchronizing and blanking signals of said video signals and having a phase established to reduce the amplitude of the horizontal synchronizing signals by the relatively negative going portions of said first sinewave signals, a second source of second sinewave signals having a predetermined frequency and phase relationship relative to the frequency and phase of said first sinewave, first means for modulating said video signals modulated on a carrier with said first sinewave signals, second means for modulating the output of said first means for modulating with said second sinewave, and means for transmitting the output of said second means for modulating.

10. A system as recited in claim 1 wherein the frequency of said first sinewave signals is the same frequency as that of said horizontal synchronizing signals, the frequency of said second sinewave signals is twice the freqeuncy of said first sinewave signals.

11. A system as recited in claim 9 wherein the said horizontal of said first sinewave signals is twice the frequency of said horizontal synchronizing signals, the frequency of said second sinewave signals is twice the frequency of said first sinewave signals, and there is included a source of fourth sinewave signals having the frequency of said horizontal synchronizing signals and a phase which is periodically switched to be in plus or minus 90° out of phase with the time of occurrence of said horizontal synchronizing signals, and third means for modulating the output of said second means for modulating with said third sinewave signals.

12. A system as recited in claim 10 wherein the degree of modulation of said video signals modulated on a carrier by said first sinewave signals is 0.3, the degree of modulation of said video signals modulated on a carrier by said second sinewave signals is 0.045.

13. A system as recited in claim 11 wherein the degree of modulation of said video signals modulated on a carrier by said first sinewave signals is 0.3, the degree of modulation of said video signals modulated on a carrier by said second sinewave signals is 0.045, the degree of modulation of said video signals modulated on a carrier by said third sinewave signals is 0.1.

14. A system as recited in claim 9 wherein there is included means for generating program audio signals modulated on a carrier, and means for adding said program audio signals moudulated on a carrier to said video signals modulated on a carrier prior to being applied to said first and second means for modulating, for modulating said respective first and second sinewaves on said program audio signals modulated on a carrier simultaneously with their being modulated on said video signals modulated on a carrier.

15. In a system wherein video signals modulated on a carrier are encoded by being first modulated with first sinewave signals and thereafter with second sinewave signals having a predetermined phase and frequency relative to said first sinewave signals, a decoder comprising:

means for deriving from said encoded signals third sinewave signals having the same frequency as said first sinewave signals but being in antiphase therewith, and means for modulating said encoded video signals modulated on a carrier with said third sinewave signals for eliminating the effects of the encoding.

16. In a system wherein video signals modulated on a carrier are encoded by being first modulated with first sinewave signals and thereafter with second sinewave signals having a predetermined phase and frequency relative to said first sinewave signals and thereafter being modulated with third sinewave signals having the frequency of the horizontal synchronizing signals and a phase which varies plus or minus 90° relative to the phase thereof, a decoder comprising:

means for deriving fourth sinewave signals from said encoded signals having the same frequency but being in antiphase with said first sinewave signals, fourth means for modulating said encoded signals with said fourth sinewave signals, means for deriving fifth sinewave signals having the same frequency but being in antiphase with said third sinewave signals, and means for modulating the output of said fourth means for modulating with said fifth sinewave signals to decode said video signals modulated on a carrier.

* * * * *

UNITED STATES PATENT OFFICE
CERTIFICATE OF CORRECTION

Patent No. 3,729,576 Dated April 24, 1973

Inventor(s) Patrick R. J. Court

It is certified that error appears in the above-identified patent and that said Letters Patent are hereby corrected as shown below:

Column 6, lines 67 and 68, the expression should appear as shown below:

$$\text{and } m \text{ also} = \frac{E\,max - E_o}{E_o} \quad \text{(positive peaks)}$$

$$= \frac{E_o - E\,min}{E_o} \quad \text{(negative peaks)}$$

Column 7, line 41, the expression should appear as shown below:

$$\cos^2 x = \frac{1 + \cos 2X}{2}$$

line 48, the expression should appear as shown below:

$$= m^2 \left(\frac{1 + \cos 2x}{2}\right) + (1-m^2)$$

UNITED STATES PATENT OFFICE
CERTIFICATE OF CORRECTION

Patent No. 3,729,576 Dated April 24, 1973

Inventor(s) Patrick R. J. Court PAGE - 2

It is certified that error appears in the above-identified patent and that said Letters Patent are hereby corrected as shown below:

Column 8, line 41, the expression should appear as shown below:

$$m_{(max)} = \frac{E_{max} - E_o}{E_o} = \frac{100 - 75}{75} = 0.333$$

Column 9, line 18, the expression "-0.5bk2 cos 2x" should read -- $-0.5m^2$ cos2x --.

Signed and sealed this 19th day of March 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.